(12) United States Patent
Baumeister et al.

(10) Patent No.: US 9,381,696 B2
(45) Date of Patent: Jul. 5, 2016

(54) STRETCHING UNIT

(71) Applicant: Brückner Maschinenbau GmbH & Co. KG, Siegsdorf (DE)

(72) Inventors: Michael Baumeister, Traunstein (DE); Anthimos Giapoulis, Traunstein (DE); Markus Unterreiner, Marquartstein (DE); Tobias Häusl, Traunstein (DE); Emmerich Kulinyak, Bergen (DE); Georg Murner, Bergen (DE)

(73) Assignee: BRÜCKNER MASCHINENBAU GMBH & CO. KG, Siegsdorf (DE)

( * ) Notice: Subject to any disclaimer, the term of this patent is extended or adjusted under 35 U.S.C. 154(b) by 0 days.

(21) Appl. No.: 14/654,209

(22) PCT Filed: Dec. 20, 2012

(86) PCT No.: PCT/EP2012/005317
§ 371 (c)(1),
(2) Date: Jun. 19, 2015

(87) PCT Pub. No.: WO2014/094803
PCT Pub. Date: Jun. 26, 2014

(65) Prior Publication Data
US 2015/0314521 A1    Nov. 5, 2015

(51) Int. Cl.
*B29C 55/08*     (2006.01)
*B29C 55/20*     (2006.01)
*B29D 7/01*      (2006.01)
*B29L 7/00*      (2006.01)

(52) U.S. Cl.
CPC .............. *B29C 55/08* (2013.01); *B29C 55/20* (2013.01); *B29D 7/01* (2013.01); *B29L 2007/00* (2013.01)

(58) Field of Classification Search
CPC .......... B29C 55/08; B29C 55/20; D06C 3/04; D06C 3/025
See application file for complete search history.

(56) References Cited

U.S. PATENT DOCUMENTS

| | | | |
|---|---|---|---|
| 3,179,977 A | 4/1965 | Nash | |
| 3,258,866 A * | 7/1966 | Bates ................. | D06C 3/00 198/692 |
| 3,529,332 A | 9/1970 | Hyatt | |

(Continued)

FOREIGN PATENT DOCUMENTS

| | | |
|---|---|---|
| DE | 1 177 803 | 9/1964 |
| DE | 1 479 897 | 9/1969 |

(Continued)

OTHER PUBLICATIONS

International Preliminary Report on Patentability issued in PCT/EP2012/005317 dated Jun. 23, 2015.

(Continued)

*Primary Examiner* — Robert B Davis
(74) *Attorney, Agent, or Firm* — Nixon & Vanderhye P.C.

(57) ABSTRACT

The invention relates to an improved stretching unit characterized, amongst other things by the following: the clip-chain unit is designed such that the forces which are exerted are decoupled and applied in a tilting-free and torque-free manner to the clip-chain unit in order to prevent an increase of the surface pressure between the clip-chain unit and the supporting rail.

34 Claims, 30 Drawing Sheets

(56) References Cited

U.S. PATENT DOCUMENTS

| | | | | |
|---|---|---|---|---|
| 3,590,450 | A | * | 7/1971 | Pernick .................... D06H 7/08 26/51.3 |
| 3,727,273 | A | * | 4/1973 | Hyatt .................... B65H 23/028 26/91 |
| 4,558,496 | A | * | 12/1985 | Cramer .................... B29C 55/20 26/79 |
| 4,882,820 | A | | 11/1989 | MacKinnon et al. |
| 4,899,427 | A | | 2/1990 | Gresens |
| 4,926,529 | A | | 5/1990 | Hosmer et al. |
| 4,939,825 | A | | 7/1990 | Kwack |
| 5,072,493 | A | * | 12/1991 | Hommes ................. B29C 55/20 26/72 |
| 5,636,454 | A | | 6/1997 | Shida |
| 5,749,131 | A | * | 5/1998 | Breil ....................... B29C 55/20 26/89 |
| 5,797,172 | A | | 8/1998 | Hosmer |
| 7,073,237 | B1 | | 7/2006 | Cavanagh |
| 2005/0017123 | A1 | | 1/2005 | Meyer |
| 2008/0235981 | A1 | | 10/2008 | Kato et al. |
| 2012/0068376 | A1 | | 3/2012 | Sano et al. |
| 2015/0328826 | A1 | | 11/2015 | Baumeister et al. |

FOREIGN PATENT DOCUMENTS

| | | |
|---|---|---|
| DE | 21 49 032 | 4/1972 |
| DE | 2 225 337 | 12/1973 |
| DE | 27 49 119 | 5/1979 |
| DE | 33 39 149 | 5/1985 |
| DE | 35 03 612 | 8/1986 |
| DE | 37 41 582 | 6/1989 |
| DE | 39 28 454 | 3/1991 |
| DE | 44 36 676 | 4/1996 |
| EP | 0 138 177 | 1/1988 |
| EP | 0 455 632 | 11/1991 |
| EP | 0 471 052 | 10/1994 |
| GB | 971737 | 10/1964 |
| GB | 1 186 828 | 4/1970 |
| GB | 2 178 077 | 2/1987 |
| JP | 7-108599 | 11/1995 |
| WO | 90/09055 | 8/1990 |

OTHER PUBLICATIONS

International Preliminary Report on Patentability issued in PCT/EP2013/003598 dated Jun. 23, 2015.

International Preliminary Report on Patentability issued in PCT/EP2013/003599 dated Jun. 23, 2015.

International Search Report for PCT/EP2012/005317, mailed Aug. 16, 2013, four pages.

Written Opinion for PCT/EP2012/005317, mailed Aug. 16, 2013, four pages.

International Search Report for PCT/EP2013/003599, mailed Mar. 17, 2014, four pages.

Written Opinion for PCT/EP2013/003599, mailed Mar. 17, 2014, five pages.

International Search Report for PCT/EP2013/003598, mailed Feb. 21, 2014, four pages.

Written Opinion for PCT/EP2013/003598, mailed Feb. 21, 2014, four pages.

U.S. Appl. No. 14/654,222, filed Jun. 19, 2015, in the name of Eckart et al.

U.S. Appl. No. 14/654,264, filed Jun. 19, 2015, in the name of Baumeister et al.

Office Action issued in U.S. Appl. No. 14/654,264 dated May 6, 2016.

* cited by examiner

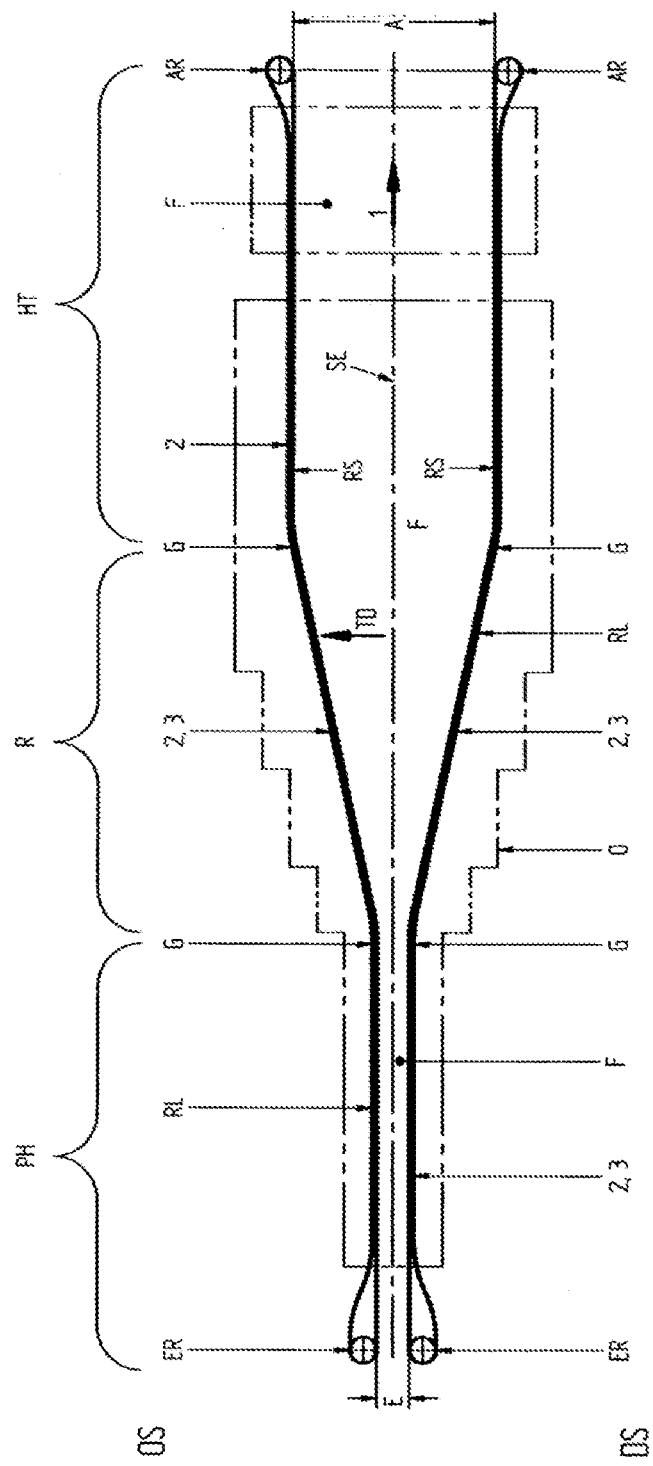

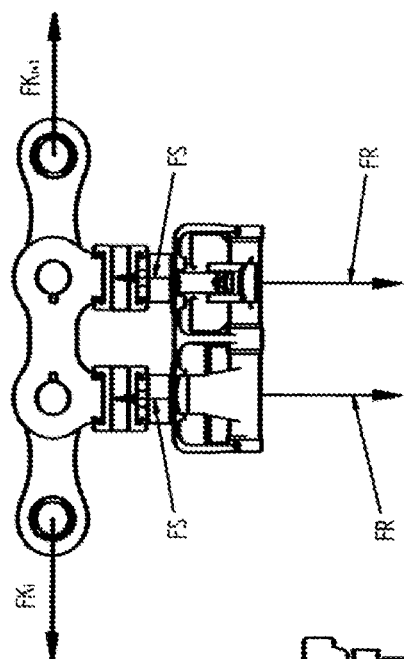
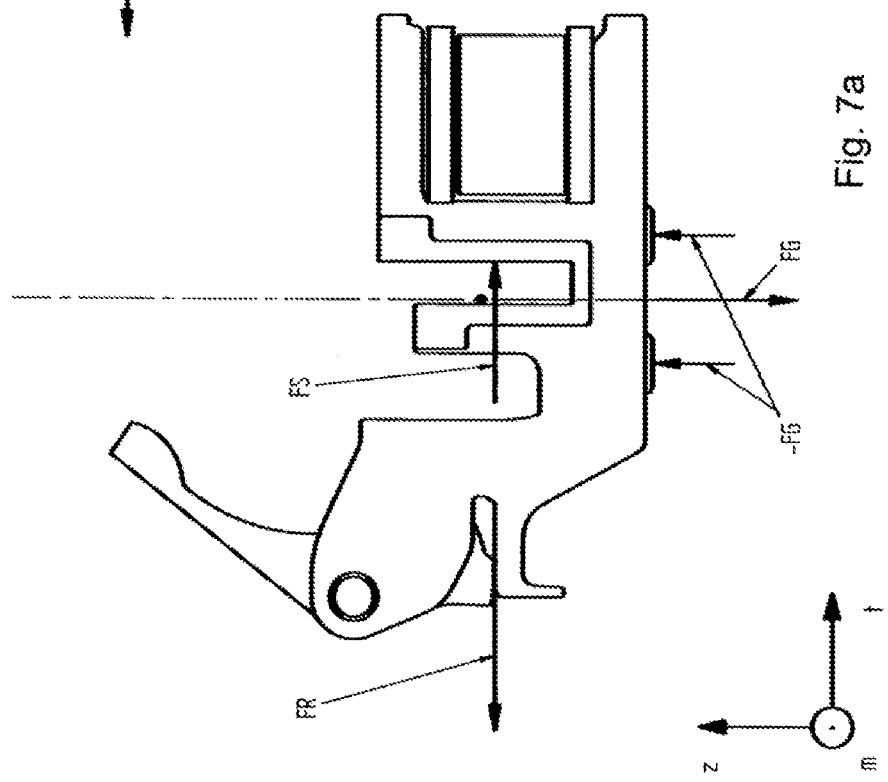
Fig. 7a
Fig. 7b

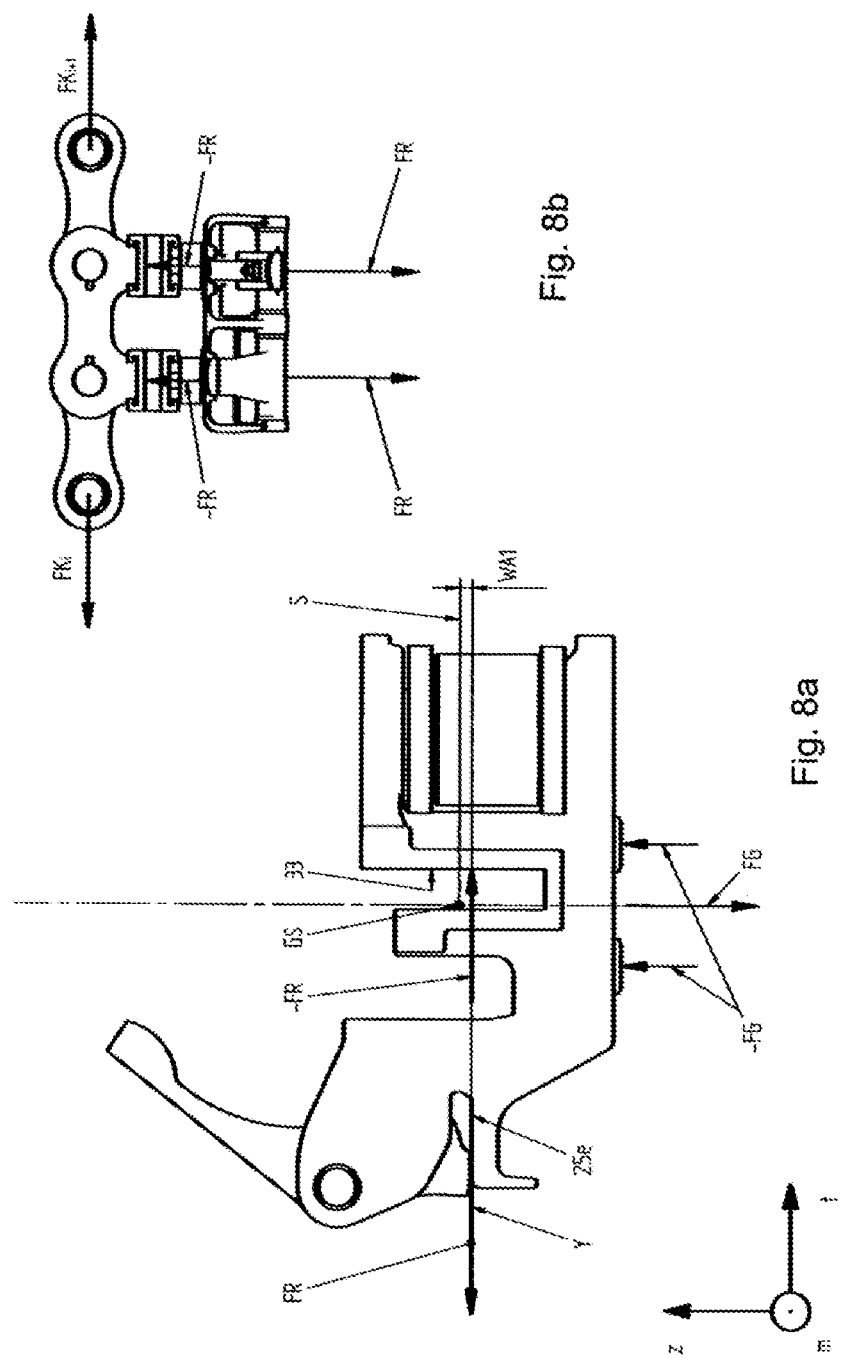

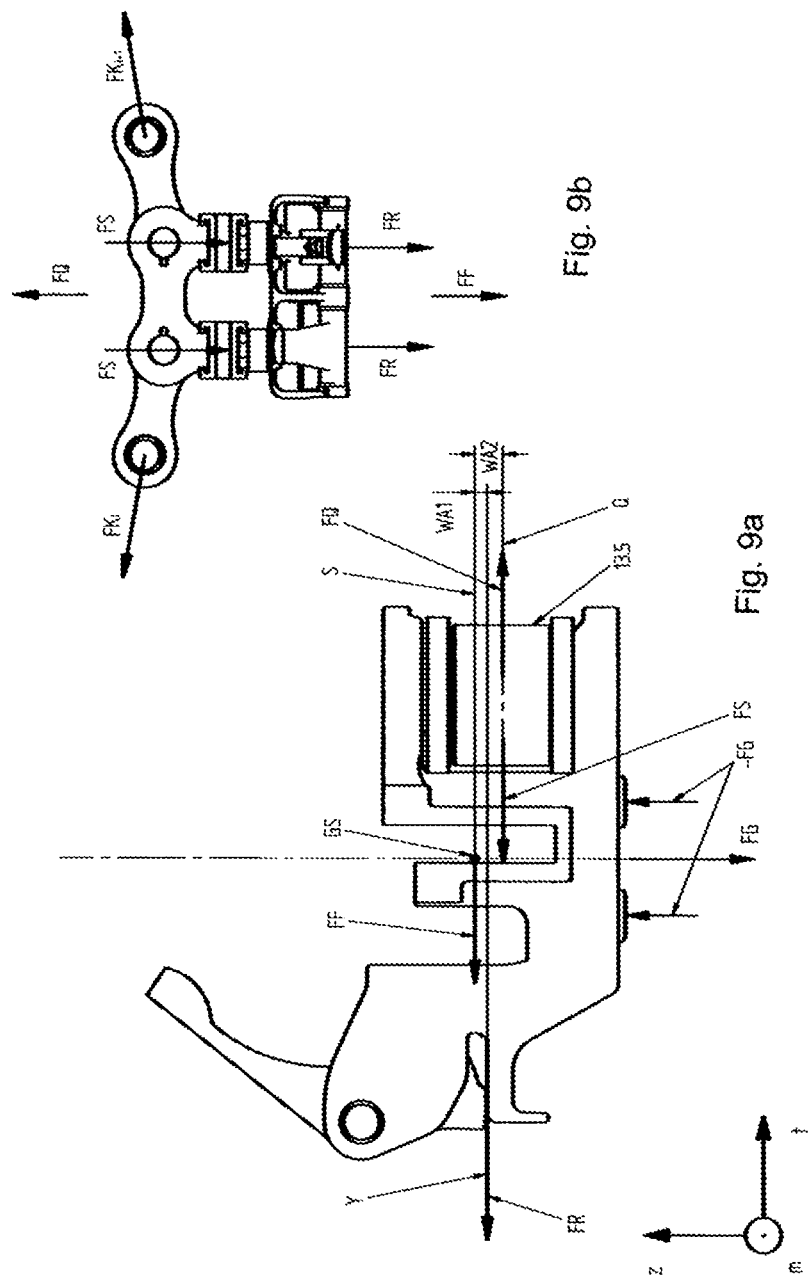

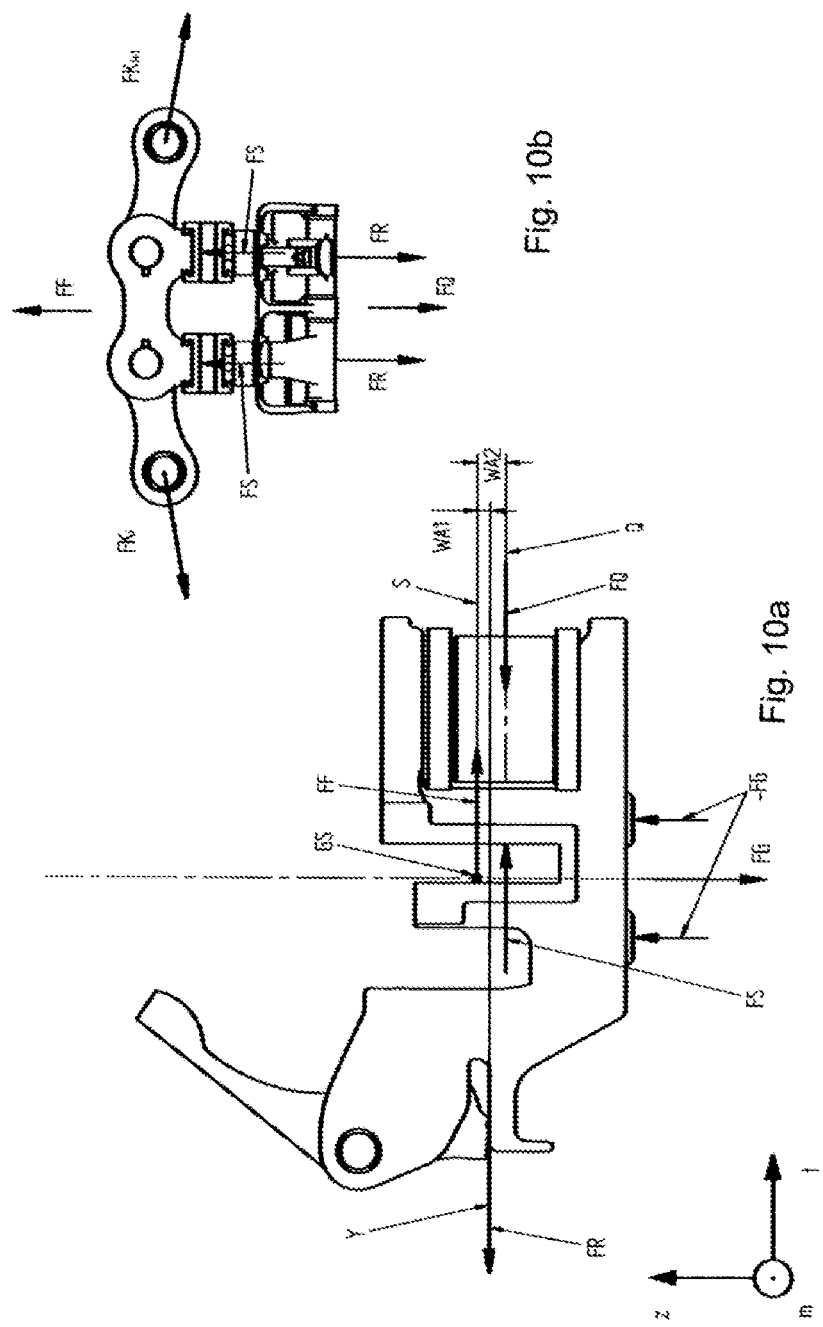

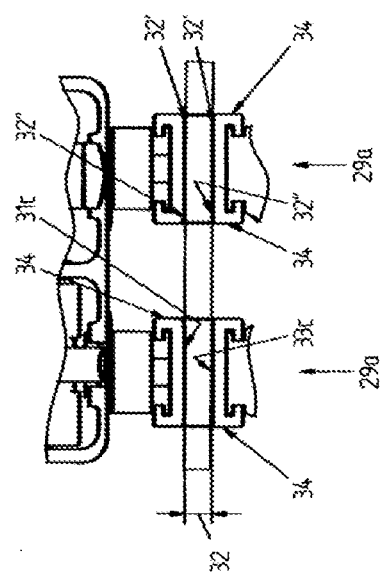
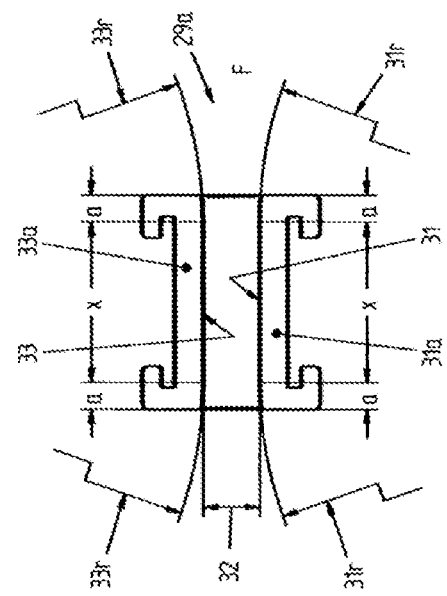
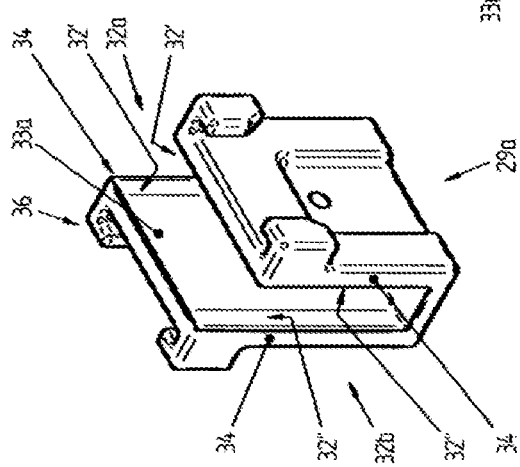
Fig. 16
Fig. 15
Fig. 14

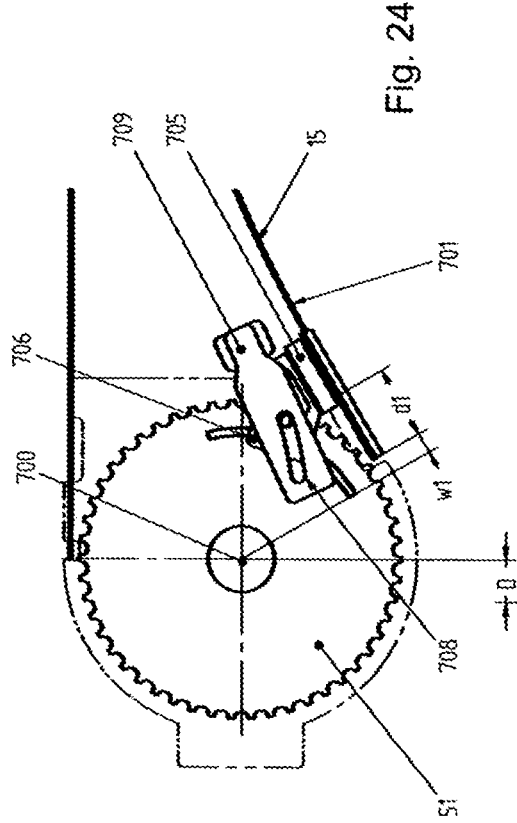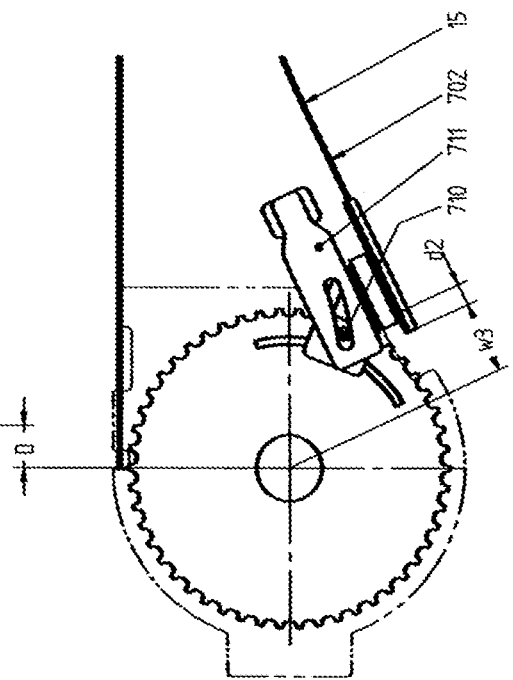

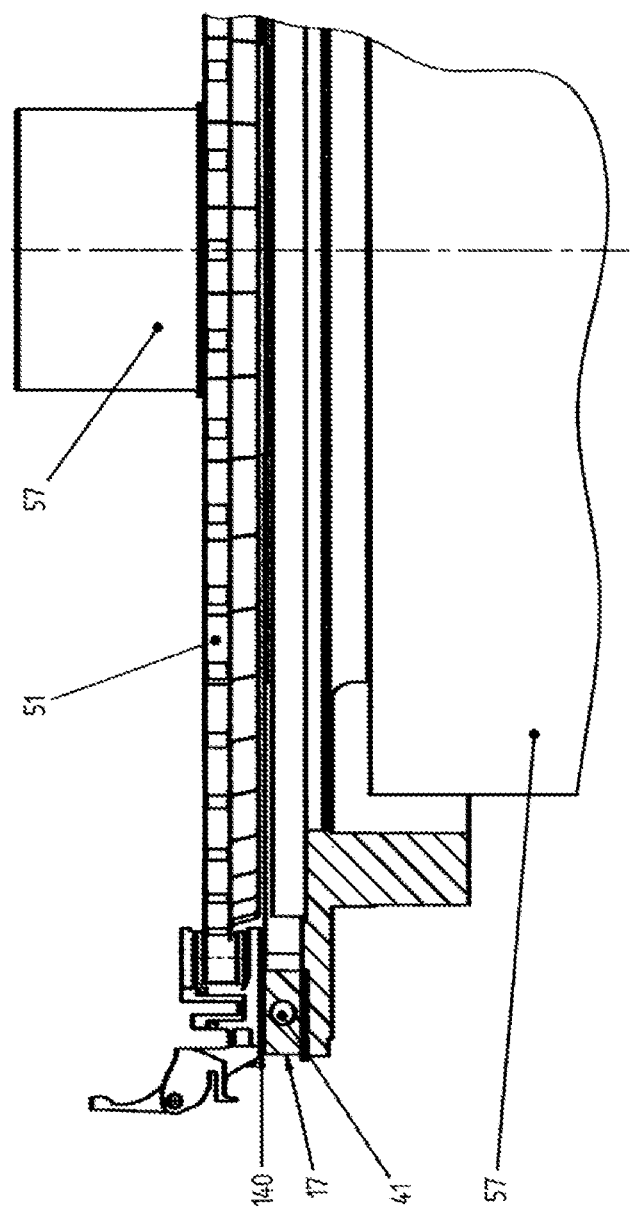

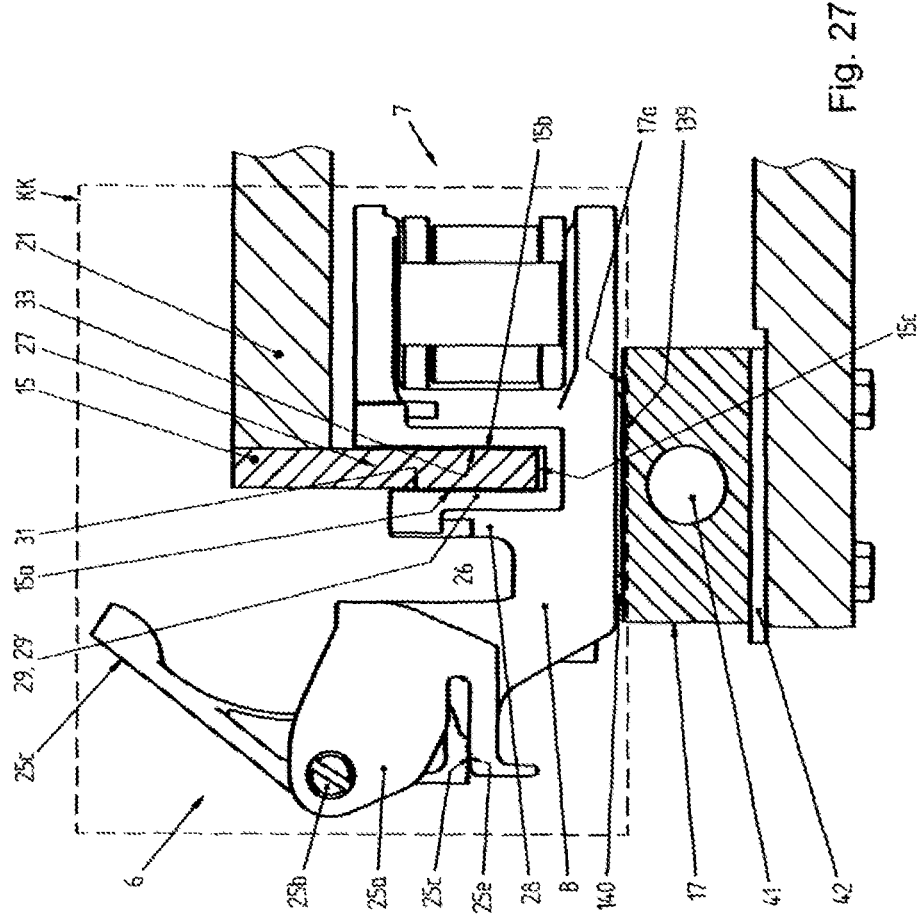

STRETCHING UNIT

This application is the U.S. national phase of International Application No. PCT/EP2012/005317 filed 20 Dec. 2012 which designated the U.S., the entire content of which is hereby incorporated by reference.

The invention relates to a stretching unit in accordance with the preamble of claim 1.

Stretching units are used in particular in plastics material film manufacture. Simultaneous stretching units are known, in which a plastics material film can be stretched in the transverse and longitudinal directions simultaneously. Sequential stretching units are also known, in which a plastics material film is stretched in two successive steps, for example initially in the longitudinal direction and subsequently in the transverse direction (or vice versa).

A generic transverse stretching unit or transverse stretching stage within a stretching unit is known from U.S. Pat. No. 5,797,172. According to this prior publication, a material web to be stretched, in other words generally a plastics material film, is gripped using clips, which are attached to chains and which are displaceably arranged on both sides of the material web to be stretched, on peripheral guide rails. The clips are displaced in succession from an entrance region (in which the edge for example of a plastic material film to be stretched is gripped) via a stretching region (in which the opposing clips are moved away from one another on the guide rail portions with a transverse component divergently from the transport direction) to an exit region and subsequently on a return path back to the entrance region, it being possible to subject the film for example to a degree of relaxation and/or heat treatment in the exit region.

This transverse stretching unit comprises a guide rail along which the transport chain is guided, a further support construction having a support rail, on which the weight of the peripheral chain can be braced in the region of the clips, being provided below said guide rail. The transport chain in general and the clip bodies in particular, which are formed offset on the chain links in the longitudinal direction of the transport chain, each comprise an upper and a relatively lower pair of sliding elements oriented towards one another, which are moved together with the clip and which are positioned against the two opposing running and sliding faces, which face away from one another and are oriented vertically and mutually parallel. As a result, the transverse forces can be braced on the guide rail, in other words including inter alia the stretching forces, the centrifugal forces and the chain forces. Further, as a result of this design principle, the corresponding tilting moments, which are introduced to the clips and thus to the transport chain, should also be absorbed and braced on the guide rail. In this construction, the plane of gravity, the longitudinal chain force plane and the stretching force plane are all positioned a long way apart from one another, and bring about loading of the sliding bearings, in particular the guide rail sliding bearings, on one side even without any external force applications, such as the stretching force, tilting moments, etc.

A width-stretching unit comprising a guide rail is known in principle for example from EP 0 471 052 B1. In this case, a peripheral transport chain is displaceably guided and braced by way of clip carriages on the guide rail. For this purpose, two support or guide wheels, which rotate about a vertical axis, are respectively provided on the two opposing vertical faces of the guide rail which is rectangular in cross section. Further support wheels rotate about a horizontal axis and are arranged in such a way that the weight of the transport chain and the clips is braced on the upper, horizontally oriented narrow face of the guide rail.

A guide device for tensioning clips, which are combined to form a continuous chain and guided so as to slide, in a stretching frame is also known from DE 27 49 119 A1. The transport system is distinguished by a rail system comprising an upper and a lower support and guide rail, which are arranged spaced apart one above the other in the vertical direction. In this case, a double chain is further provided as a transport system, specifically comprising both upper and lower chain links—relative to the support and guide rail—which are braced between the vertically upwardly and vertically downwardly facing sliding faces of the rail system. The clip table for gripping a film in place is arranged at a height which is positioned centrally with respect to the rail and chain system. As a result, a central force application on the chain system can be implemented, specifically even if the transport chain comprising the clips passes through the stretching region, whilst corresponding stretching forces are thus introduced by the film to the peripheral transport chain comprising the clips. In this case, the centre of gravity is outside the guide rail, and thus brings about tilting of the arrangement. The entire weight of the arrangement is merely braced on the small sliding face of the element.

A central introduction of force in a transport chain system is also known in principle from DE 33 39 149 A1. In this case, the peripheral chain is braced between an upper sliding piece and a relatively lower sliding piece spaced apart therefrom, in a profiled frame of a U-shaped cross section, defining the path of the advanced chain. Further, a third sliding piece is also provided, which is offset in the transverse direction, specifically in the direction of a needle bar support arm on which the forces acting transversely in the direction of the needle bar support arm can be braced, from the two aforementioned horizontally oriented pieces arranged vertically spaced apart from one another.

A combined tensioning clip is known from DE 22 25 337. It comprises a clip lever, referred to as a needle bar, having a needle bar carrier extending under the clamping table preferably at 45°. On the outer face remote from the material web, a rail support of a C-shaped cross section is mounted in the guide path of the clips bodies which thereby defined. The application of force of the material web to be treated, which engages on the clip bodies, is introduced centrally into the peripheral transport chain, the clip body being displaceable by means of a sliding bearing in the guide rail system of a C-shaped cross section. The C rail construction is in particular not suitable for articulations for high-speed systems.

Further, however, a series of transport systems for treating a material web, and in particular of transverse-stretching units comprising peripheral transport chains and clips formed thereon, which are likewise braced on a rail carrier system by means of a sliding bearing, is known, although in this case the forces acting horizontally on the clip bodies via the material web are not introduced centrally into the transport chain bracing system.

Systems of this type are known for example from DE 35 03 612. The system is held braced via a support rail by means of a sliding bearing, the transport chain being braced via a vertical sliding rail, positioned away from the edge of the material web to be treated, for absorbing tilting moments. In this case too, the plane of gravity is positioned a long way outside the stretching force plane, and thus causes a tilting moment. In addition, the transverse force caused by the chain longitudinal force cannot provide sufficient bracing.

A principle which is similar in this regard is known from DE 11 77 803, and exhibits bracing of the transport chain with respect to a horizontal sliding bearing. A torque support is further provided for absorbing the stretching forces in the width-stretching frame.

A likewise comparable principle is also disclosed in JP 07 108 599. However, EP 0 138 177 B1 also discloses a tensioning chain for stretching-frame driers, in which the links of the transport chain, i.e. in particular the clip bodies, are held by way of a base contact element with respect to a horizontal support face and by way of a side contact element on a vertically oriented side contact element, the surface of which faces away from the treatment web, and the transport chain is thus braced. A torque support is further provided, and engages in a groove-shaped recess of the support rail system on the side of the transport chain remote from the treatment web. The stretching forces introduced via the treatment web thus act approximately centrally on the transport chain system. The shown and disclosed contact elements, which are provided on the chain links, are to consist for example of friction-reducing polytetrafluoroethylene filled with carbon.

An arrangement which is comparable as regards the sliding and bracing device is further known from the sliding stretching frame known from U.S. Pat. No. 4,882,820. This also exhibits sliding bearing over the entire region for bracing the transport chain. For bracing the tilting moments, which are introduced inter alia by way of the stretching forces, a torque support is provided on the outer face, remote from the film to be stretched, of the clip body.

Finally, U.S. Pat. No. 4,926,529 also discloses a width-stretching frame, which dispenses with oil lubrication, just as in the aforementioned U.S. Pat. No. 4,882,820. In this case, the sliding elements are positioned in a trough, the clip bodies which are advanced together with the transport chain being slidingly braced on a horizontal support face and a vertical bracing and running face. Likewise, a rearward torque support is again provided so as to absorb the stretching forces which are in particular introduced non-centrally into the bracing system.

Starting from this prior art, the object of the present invention is to provide an improved transport system for stretching a material web, in particular a plastics material film, in the transverse direction, which as a whole can be operated at lower friction, and thus with less wear, whilst requiring less energy, for a given system speed.

The object is achieved in accordance with the invention by way of the features specified in claim 1 and in accordance with the features of claim 21 or by way of the features specified in claim 33. Advantageous embodiments of the invention are specified in the dependent claims.

The present invention provides a greatly improved configuration of a corresponding transport chain system comprising associated clips for clamping, holding, advancing and stretching a material web, making it possible to achieve major advantages. The system according to the invention can be operated at much higher speeds, without this leading to overheating or to the occurrence of excessive frictional forces.

The central concept of the invention is based on the fact that the forces acting on the clip and/or the transport chain, such as stretching forces, centrifugal forces etc., and the chain transverse forces or lateral guiding forces etc., introduced by the transport chain in particular in the curved region, are virtually completely decoupled from the gravitational forces. In other words the construction of the transport chain and the clips is implemented in such a way that the gravitational forces acting on the transport chain and in particular the clip bodies are mutually perpendicular with respect to the further stretching forces, introduced for example during the stretching process.

In the largest portions of the peripheral path of the transport system, therefore, only gravitational forces occur. Therefore, continuous cooling in the peripheral path is at most merely required for gravity, whilst load relief or cooling of the side guide rail is only required in particular regions.

In the context of the invention, if cooling is to be provided, this can be implemented in the form of direct cooling.

The construction means that the transverse forces which additionally act on the transport chain and the clip chain units do not bring about any tilting moments or at least are reduced by comparison with conventional solutions, since tilting forces of this type which occur in the prior art lead to an increase in the frictional forces in relation to the sliding bearing of the transport chain.

In other words, a torque support as required in the prior art can be dispensed with, since rotational or tilting movements of the clip body about a tilt axis extending in the feed direction of the transport chain no longer occur or do not occur to a significant extent.

Thus, in the context of the invention, the weight of the clip chain system does not create any additional bracing forces. Instead, the more or less ideally positioned centre of gravity contributes to no further tilting moments occurring which would have to be braced on and absorbed by the guide rail and/or the weight rail or supporting rail. This is an important difference from the prior art, as known for example from U.S. Pat. No. 5,797,172. In said prior art, the forces act on the clip transport part in such a way that an elevation factor is created. An elevation factor occurs when the forces introduced to the clip body, in other words the clip transport part, in other words the clip chain part, are not introduced directly into the guide face of the guide rail. In the aforementioned previously known solution according to U.S. Pat. No. 5,797,172, however, this results in additional tilting forces (lever factors), which are directed in an opposing manner on the upper and lower parts of the guide rail and which lead to additional friction, being produced and introduced at the guide rail, which is positioned asymmetrically offset from the clip table in the vertical direction (and likewise horizontally laterally offset from the support rail). This is also prevented according to the invention by the balanced-out system, the plane of gravity of which is positioned in a manner collinear with the guide rail, in other words within the guide rail.

In the context of the invention, as a guide rail, a guide rail is preferably used on which the clip chain unit can be braced perpendicularly to the gravitational force. The gravitational force itself is absorbed and braced by a support rail, separate from the guide rail and preferably arranged below the guide rail. As a result, in the context of the invention it can be ensured that the clip chain units can be mounted decoupled from one another, both on the guide rail and on the weight running face which braces the weight of the transport chain, in each case by means of a sliding bearing, without it being possible for excessive wear, excessive friction and thus excessive overheating to occur. Cooling or load relief of the guide rail is thus only required where lateral forces, such as the stretching force, occur. All of the forces can be introduced without tilting moments at as uniform an area load as possible.

Finally, in the context of the invention, not only a reduction in the tilting moments but also a reduction in and improvement of the stretching and lateral guidance forces and a reduction in the weight of the transport chain and the clip itself can be achieved, in part because of the construction which is improved in the context of the invention.

Finally, in the context of the invention it is likewise proposed for the stretching forces which are introduced to the clip chain unit to act on the relevant clip chain body and thus on a transport chain in a plane or close to the plane of gravity, in other words at an application point on the chain body which is positioned more or less in the same plane as the application points for the centrifugal forces (identical to the plane of gravity) which occur in curved guide path portions or the transverse or lateral forces which occur as a result of the transport chain and the tensile forces introduced thereby in curved guide path portions. This all contributes to a high degree of compensation of the applied forces, together with a desirable reduction in the total load on the guide rail or the support rail. The construction is also improved in such a way that the forces brought about by the chain longitudinal forces are introduced in or close to the plane of gravity.

Further, an improvement can also additionally be brought about in that the transport chain and especially the clips are made of particularly light material, and may even for example consist predominantly of carbon-fibre materials. This leads to a major weight reduction in a transport chain system of this type.

A reduction of this type in the total weight of the moved parts with respect to the fixed parts ultimately also leads to a further reduction in the contact stress on the sliding elements which brace the weight of the transport chain.

Conventionally, the parts of the transport chain which are advanced by way of the sliding friction, which are braced on a generally horizontal sliding rail, have to be lubricated appropriately using oil, so as to reduce the coefficient of friction and thus also indirectly to contribute to cooling of the system. The aforementioned weight reduction may already lead to a significant reduction in oil consumption, and thus also to preventing oil stains on the product to be manufactured (generally the plastics material film).

In a development of the invention, the guide rail may be cooled, in particular merely cooled where a load on the rail occurs. In the context of the invention, the balanced-out system means that cooling of this type is merely required for energy reduction in less than 30%, possibly even in a region of less than 25% or 20%, of the total peripheral path.

In the present case, in addition or as an alternative, to improve the cooling a support rail may be provided which is equipped with an integrated cooling duct through which a fluid coolant—liquid or gas—can flow and can thus contribute to the cooling of the entire rail system and in particular of the support sliding face. This also serves to reduce the amount of oil or oil consumption required for the friction.

A significant feature for the cooling is the dissipation of the heat brought about by friction. An excessively hot sliding member pair leads to cracking of the oil, which then iteratively leads to higher friction, to further cracking and so on.

Further, to further improve the system as a whole, it may also be provided not only that sliding materials are used which are particularly favourable per se and which have extremely good emergency running properties, but also that, in the context of the invention, air bearing is provided which in effect contributes to floating bearing and bracing of the transport chain links and the clips on the weight running face (and potentially also on the guide rail). As a result, a type or air-cushion effect can be brought about, making it possible to provide very low-friction, virtually frictionless bearing.

Finally, inter alia the jointless transitions, provided in the context of the invention, from the guide rail portions which extend more or less straight to the chain wheels at the entrance and exit of the system as a whole also contribute to the overall improvement of the system.

Ultimately, as a result of the aforementioned individual features or a plurality or all of the aforementioned features, extremely low friction is ensured, meaning that the system speeds can be greatly increased once again by comparison with conventional stretching units.

Thus, overall, the service life of a system of this type can also be increased because of the reduction in wear, whilst reducing the maintenance outlay. In addition, the energy consumption can be reduced and the friction (heat) can be dissipated well.

Further advantages, details and features of the invention will become apparent from the embodiments described in the following with reference to the drawings, in which, in detail:

FIG. 1a is a schematic plan view of a transverse stretching unit comprising a shared support structure for the processing side and the return side within the furnace;

FIG. 4b is a corresponding plan view of the embodiment of FIG. 4a;

FIG. 6b is a corresponding plan view of the embodiment of FIG. 6a;

FIG. 7a to FIG. 10c are side views and plan views of the corresponding clips, illustrating the different forces acting on the different guide path portions;

FIG. 14 is a three-dimensional drawing of a guide rail sliding bearing in the manner of a sliding block;

FIG. 15 is a plan view of the embodiment of FIG. 14, illustrating the flattened regions provided according to the invention which have a predetermined radius of curvature in the entrance region and exit region of the guide rail sliding bearing;

FIG. 16 is a partial plan view of a clip body comprising two mutually offset guide rail sliding bearings having flattened regions provided in the entrance and exit region;

Figure 21:
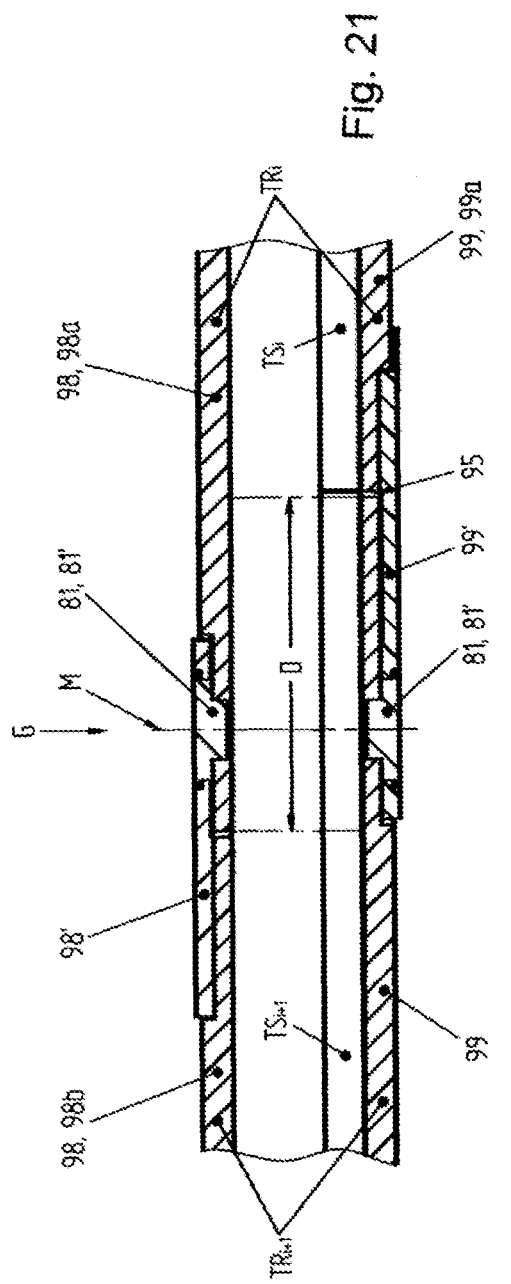
Figure 21A:
Figure 21B:
Figure 23:
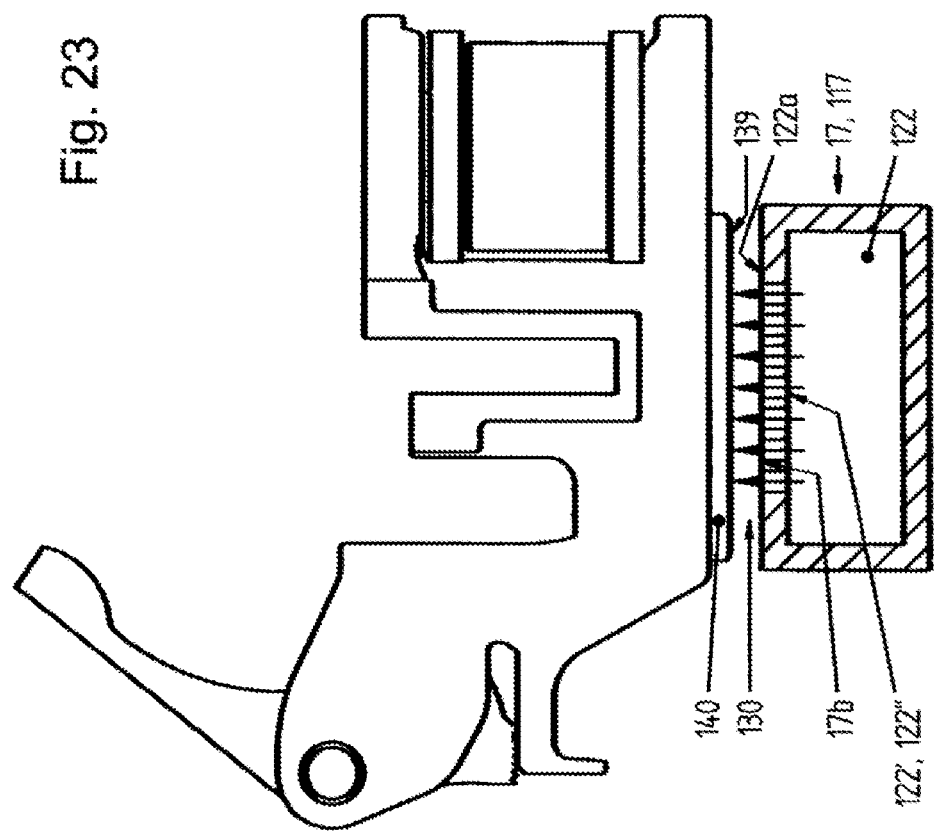

FIGS. 21*a* and 21*b* show a bending moment acting on an articulation in a solution according to the invention by comparison with a solution known in the prior art;

FIG. 23 is a side view of a modified embodiment of a clip body which is braced along a support rail located therebelow and is displaceable using an air cushion;

FIGS. 24 and 25 each show a chain edge in the exit region of the transverse stretching unit, having an automatic adjustment option so as to make it possible for the chain to enter the relevant chain wheel tangentially for a different position (chain tension) of the chain wheel; and FIGS. 26 and 27 each show the peripheral support and cooling rail which extends around the chain wheels along the guide path.

BASIC CONSTRUCTION OF THE TRANSVERSE STRETCHING UNIT

The disclosed film width-stretching or transverse stretching unit, also referred to in the following as a TD stretching unit for short (TD=transverse direction), comprises, in a known manner, two symmetrically formed drive systems. FIG. 1*a* illustrates the two drive systems, extending perpendicular to the plane of the drawing and arranged symmetrically about the plane of symmetry SE, the material web to be treated, in other words to be stretched, in particular in the form of a plastics material film F, being moved through between the two drive systems, which move on closed paths 2, in the withdrawal direction 1 (in other words the machine direction MD). The disclosed TD stretching unit may also be part of a sequential stretching unit, which conventionally comprises a longitudinal stretching stage upstream from the transverse stretching unit (transverse stretching frame). (However, in case of doubt, this longitudinal stretching stage may also be downstream from the transverse stretching stage). The stretching unit shown in FIG. 1*a* comprises two chain transport systems 3 driven in the peripheral direction on the two peripheral paths 2.

A biaxial (if a longitudinal stretching unit is upstream from the shown transverse stretching unit) or an unstretched film F (the term "film" being used in the following even though a treatment web F in general can be treated and transversely stretched using a stretching unit of this type, the invention thus not being limited to a plastics film web in this regard) extends into the stretching unit in the entrance region E, where it is gripped and clamped at both edges 8, specifically on the operator side (OS) and the drive side (DS), by clips, explained in greater detail in the following and shown for example in FIG. 2. The film F is subsequently heated in a downstream preheating zone PH, and subsequently supplied to a stretching zone R so as to be stretched in the transverse direction TD there. Subsequently, the stretched film F passes through various heat treatment zones HT, in which relaxation of the film can also take place. At the end of the stretching unit, in the exit zone A, the film is clipped by suitable means and subsequently exits the transverse stretching machine, in other words the transverse stretching unit TD.

In the following, reference is further made to a clip transport unit KT, also sometimes referred to in the following as a clip chain unit KK. On the one hand, said clip transport unit KT or clip chain unit KK comprises the clip part 6 which is connected to the chain or transport part 7. In the disclosed example, in which a transport chain is used, reference is preferably made to a chain part 7 which is part of the clip chain unit KK.

As is known, these clip chain units KK, in other words the aforementioned clip part 6 and the chain part 7, are located in a peripheral transport system 3, which on the one hand comprises a support structure, in other words a support construction 11 and a peripheral transport chain 13, on which the aforementioned clip parts 6 are fastened or formed so as to be entrained. The support construction 11 comprises a guide rail 15. As well as said guide rail 15, a support rail 17, also sometimes referred to in the following as a weight running rail 17, which takes the weight of the chain and the clips, is also further provided. As can also be seen from the following description, the transport chain is guided and braced, along with the clips which can be entrained in displacement thereon, on the guide rail 15 (for example by means of a sliding bearing or else by means of an air cushion bearing) and on the support rail 17 by means of an air cushion bearing.

Figure 2:
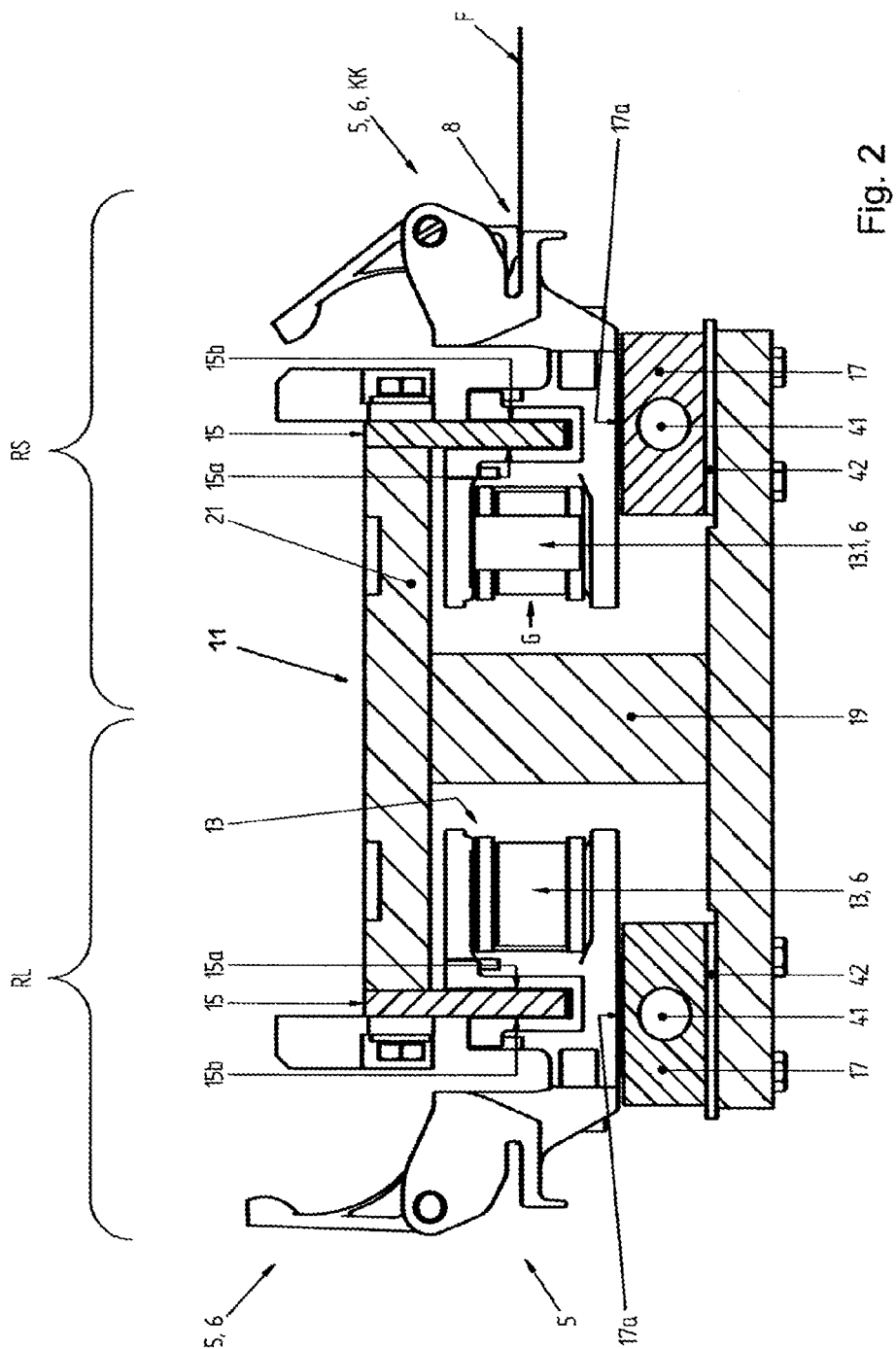
FIG. 2 is a schematic cross-section through a support structure for the guide path of a transport chain comprising associated clips.

The aforementioned support structure may be used as a shared support structure for the transport system both on the stretching or process side RS and on the return side RL (FIG. 2).

Figure 1B:
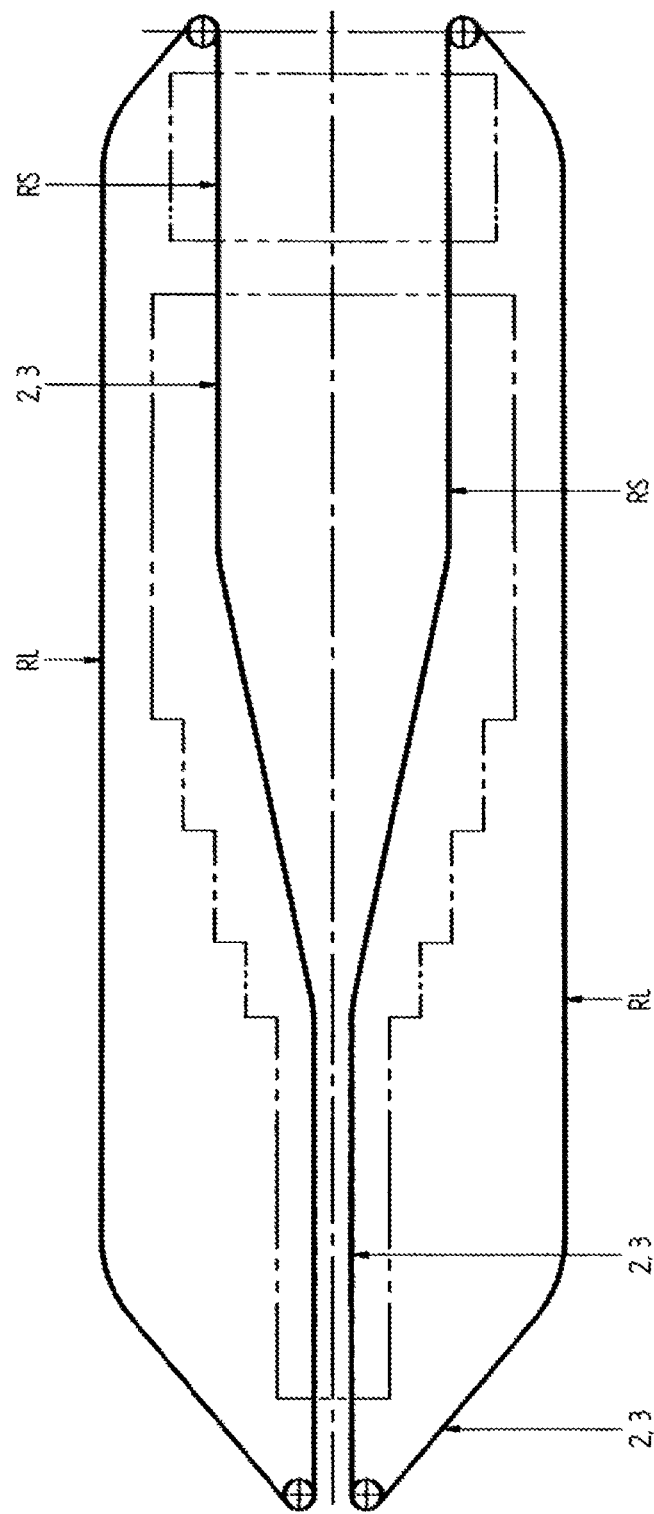
FIG. 1b is an embodiment, modified in comparison with FIG. 1a, of a return side separated from the processing side for the transport chain outside the furnace.

FIG. 2 is a cross section through the transport system, in particular comprising a shared support structure 11 which comprises, as well as an approximately vertically extending support 19 arranged in the centre, a transverse support 21 braced thereby, on the opposing ends thereof, facing away from one another, the rail 15, extending from top to bottom and rectangular in cross section, is respectively mounted, specifically as stated on the stretching side RS on the other hand and on the return side RL on the other hand. In a shared support arrangement of this type, the transport system is jointly located within a furnace O (FIG. 1*a*). Said furnace encloses the preheating zone PH, the stretching zone R, and the post-heating zone or relaxation zone HT, in such a way that ultimately only the deflection and drive systems provided on the inlet and outlet side end up positioned outside the furnace O. Otherwise, a separate support structure may also be provided for the stretching side RS and the return side RL, in such a way that in this case merely the stretching-side support structure comprising the associated guide rail and the weight running rail extends through the furnace O, and a correspondingly formed further support structure on the return side is provided outside the furnace O. FIG. 1*b* is a schematic plan view of a construction of this type.

As stated, the transport chain 13 is driven and deflected both on the exit and on the entrance side by exit and/or entrance wheels AR and ER.

So as to make the system flexible, articulations G for the guide rail and the support rail are further provided at various points, and will be discussed in greater detail below. By adjusting these articulations differently, different transverse stretching ratios can be set in particular in the stretching zone R.

Further Construction According to the Invention of the Transport System, in Particular Construction of the Transport Chain and the Associated Clip Bodies In the following, the basic construction of the transport chain 13 along with the chain parts 7 and the associated clip parts 6 (along with the clip bodies thereof) and of the support construction are described in greater detail with reference to FIGS. 3 to 5.

Figure 3:
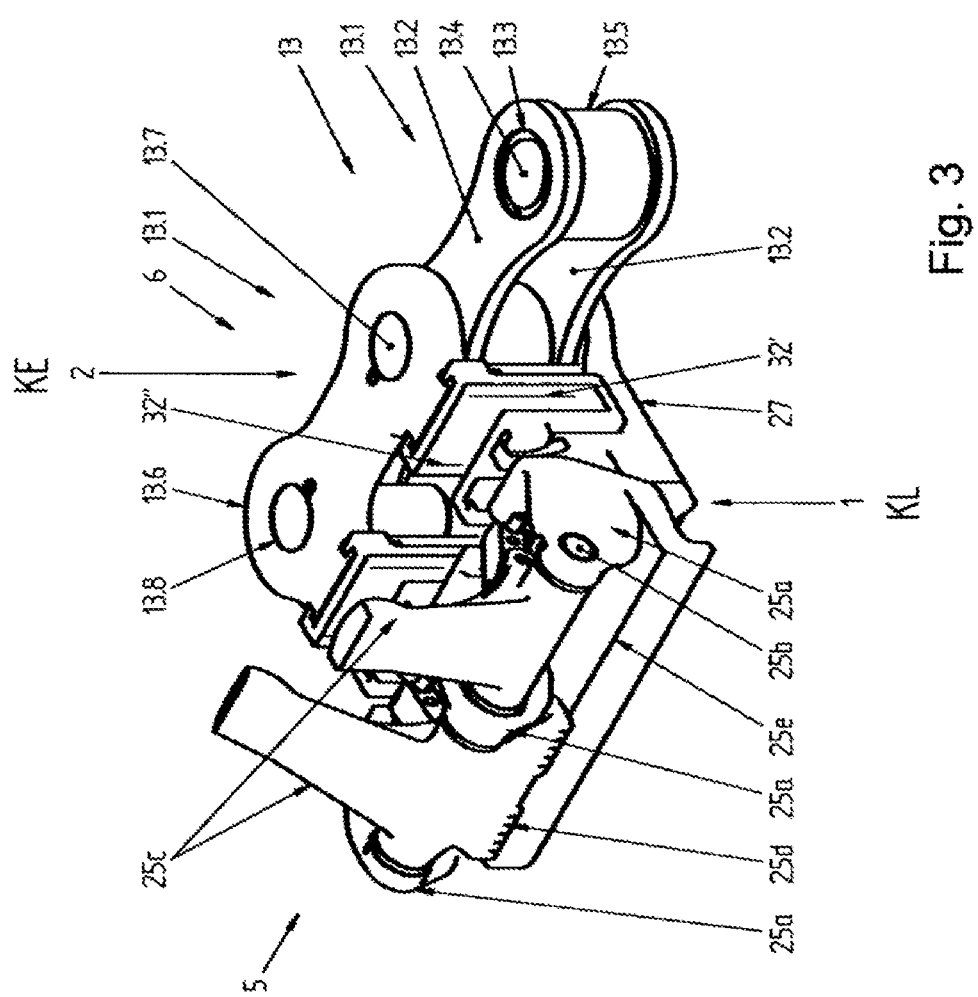
FIG. 3 is a partial three-dimensional view of a clip together with parts of the transport chain.

A detail of the transport chain 13 can be seen in FIG. 3, the transport chain in a known manner respectively comprising chain links 13.1 which are articulated to one another. In a known manner, a roller chain of this type respectively comprises a pair of inner straps 13.2 (FIG. 3), which are arranged mutually parallel having axial spacing and which each comprise two holes 13.3 in the axial extension of which a sleeve 13.4, via which the two inner straps 13.2 are rigidly interconnected, is arranged between the two straps. An outer sleeve 13.5 referred to as a small roller is placed on said inner roller 13.4, and can rotate freely on the sleeve 13.4 located therebelow.

Externally to the inner straps 13.2 in each case, outer straps 13.6 are arranged chained together, in such a way that ultimately the pair of inner straps 13.2 is connected to two adjacent outer straps 13.6, in other words a pair of forward and a pair of return outer straps. For this purpose, in each case a bolt 31.7 passes through the respective hole 13.8 in the outer strap 13.6 and penetrates the corresponding hole 13.7 in the inner strap and the internal sleeve 13.4. In each case, the relevant pair of outer straps 13.6 are likewise rigidly interconnected via these bolts 13.7.

In the embodiment shown, the outer straps 13.6 are each part of the chain parts 7. They may equally well be integrally connected to the clip part 6 or be fastened thereto.

The transport chain 13 formed in this manner comprises a clip mechanism or portion 25 having a clip mounting 25a, which for example consists of or comprises two clip flanks offset in the horizontal direction. A horizontal clip shaft (known as a blade flap) 25b extends between said clip flanks, by means of which clip shaft the corresponding clip lever 25c is subsequently pivotable in a known manner between a release position and a film fixing position in which the lower gripping face (fixing portion) 25d thereof can fix, i.e. clamp and hold, a film between the gripping face 25d and the clip table 25e.

The entire arrangement is such (as can be seen in particular from the side view of FIG. 4a and the plan view in FIG. 4b of a clip body having associated chain links) that a U-shaped recess 26 is provided between the clip part 6 (in other words the actual chain portion KE) and the chain part 7 (in other words the actual clip portion KE) so as to form a bridge part B (via which the clip part is connected to the chain part), a vertically upwardly projecting material web 28 being attached to said U-shaped recess 26 and being followed in turn by a further U-shaped recess 27 in the chain part 7, into which recess a corresponding guide rail sliding bearing 29 is inserted, sometimes also referred to in the following as a sliding block 29a. The two aforementioned U-shaped recesses 26, 27 and the vertically extending rib-shaped material web 28, which is located therebetween and extends vertically over part of the height, are all formed extending in the axial longitudinal direction of the clip chain unit KK.

This guide rail sliding bearing 29 comprises a sliding body or sliding block 29a of a U-shaped cross section, having a corresponding width or length in the direction of the guide rail 15, so as to absorb the corresponding guide forces here. For this purpose the guide rail sliding bearing 29 comprises a chain force sliding element or chain force sliding arrangement 31 positioned on the clip side and having a chain force running face 31a, also referred to in the following as a chain force sliding face 31a. Opposite thereto, a second running and/or sliding face 33a is formed on a stretching force sliding element or on a stretching force sliding arrangement 33, sometimes also referred to in the following as a stretching force running face 33a or stretching force sliding face 33a.

In this case, corresponding sliding bearings 40, 40a, 40b, on which the corresponding weight of the clip chain units KK (in other words the respective clip parts 6 along with the chain parts 7 connected thereto) is slidingly positioned on a corresponding support and/or running rail 17 (FIG. 2), are formed on the underside of the clip chain unit KK. The underside of said sliding bearing 40, 40a, 40b (via which the weight of the clip chain units KK is braced) is sometimes also referred to as a weight running face 39.

Figure 4A:
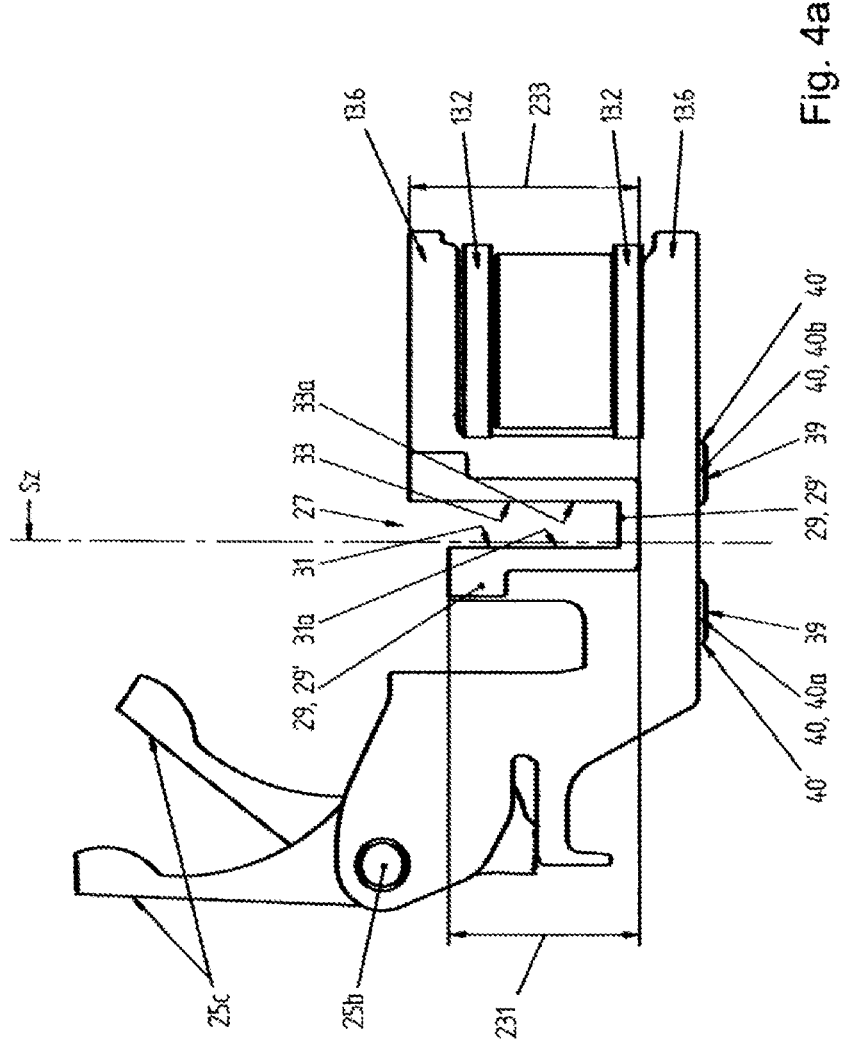
FIG. 4a is a side view of a clip according to the invention, parallel to the feed direction of the clip (to identify the directions clearly a coordinate system is illustrated where m is the transport direction along the guide rail, t is the direction of the normal vector thereto and z is the direction collinear with the guide rail)
Figure 4B:
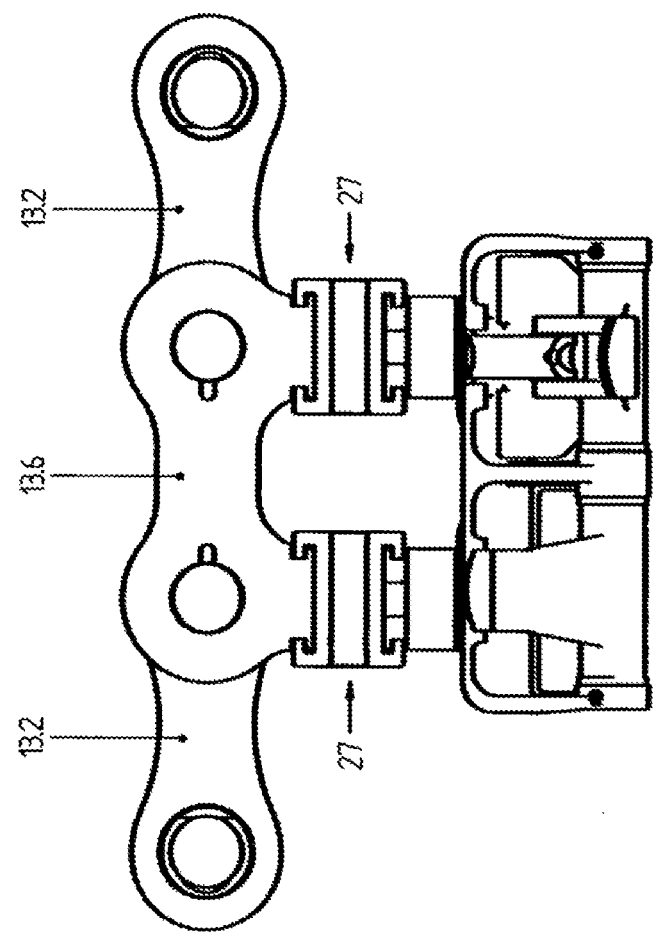

From the drawings according to FIGS. 3, 4a and 4b, it can further be seen that in the disclosed clip construction two clip levers 25c, sometimes also referred to as blade flaps 25c, are arranged on the clip body 6. Said levers or flaps may be pivotally arranged on a shared clip axis 25b, it being possible for the two clip levers or blade flaps 25c to be switched between the open and closed positions thereof separately from one another. This too leads to a reduction in the total weight and the total costs. Naturally, systems comprising just one or more than two blade flaps are also possible.

Finally, the weight and costs are also reduced in that, in the embodiment shown, a chain pitch of for example 75 mm is implemented for the transport chain 13, in other words a chain pitch of preferably more than 60 mm and less than 90 mm, in particular more than 65 mm and less than 85 mm, preferably between 70 mm and 80 mm. In principle, however, all pitches are conceivable for the claimed system.

The disclosed clip body 6 along with the chain part 7 rigidly connected thereto is advanced as part of the transport chain 13 on the support construction 11 previously described with reference to FIG. 2, both on the processing or stretching side RS and on the return side RL (FIG. 2 showing an embodiment corresponding to FIG. 1a), otherwise the forward movement and the return movement, and thus the support construction for the guide rail on the forward side and the return side, would be separate. From this drawing, it can further be seen how a relevant clip chain unit KE is guided together with the sliding bearing 29 thereof of a U-shaped cross section, in that the corresponding two opposing sliding bearing faces are positioned and thus guided on the opposing outer faces 15a, 15b of the guide rail 15 designed as a guide rail during the forward movement of the transport chain.

Description of the Forces Acting on the Clip in Connection with the Solution According to the Invention In the following, the further construction of the transport chain and the forces acting on the clip chain units KK are discussed, so as to show what features lead to improved force absorption and force bracing of the clip chain units KK on the support and bracing device in the context of the invention, the advantages achievable in the context of the invention being clarified by way of different track portions of the transverse stretching unit.

Figure 5:
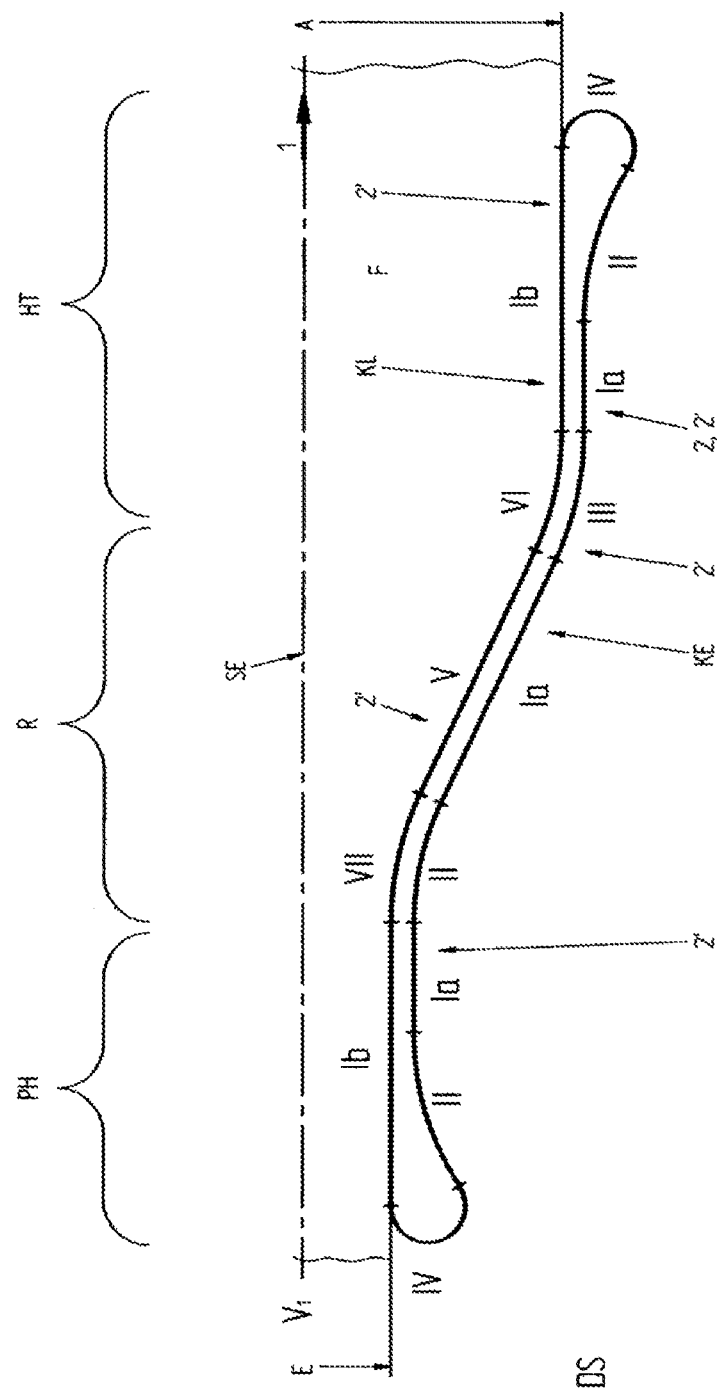
FIG. 5 is a schematic drawing of one of the two guide paths, generally positioned symmetrically to one another, for the transport chain, which is subdivided into different guide path portions to illustrate the different force relationships.

Similarly to FIG. 1a, FIG. 5 is a plan view showing at least one peripheral path 2 of the transport system 3, specifically the transport system positioned to the right in the withdrawal direction 1 on the drive side DS, having the peripheral guide rail 15, the track portions both on the processing or stretching side RS and on the return side RL being subdivided into different path portions 2' for illustrating the invention.

Different forces act on the transport chain system, depending among other things on the different phases or portions along the guide rail 15. For this purpose, reference is also further made to FIGS. 6a and 6b, which are side views (transverse to the guide path) of a clip body to illustrate what forces act where, FIG. 6b being a corresponding plan view of the clip in a detail of the transport chain 13.

The following forces are present and are to be distinguished:

Gravitational Force FG

Figure 6A:
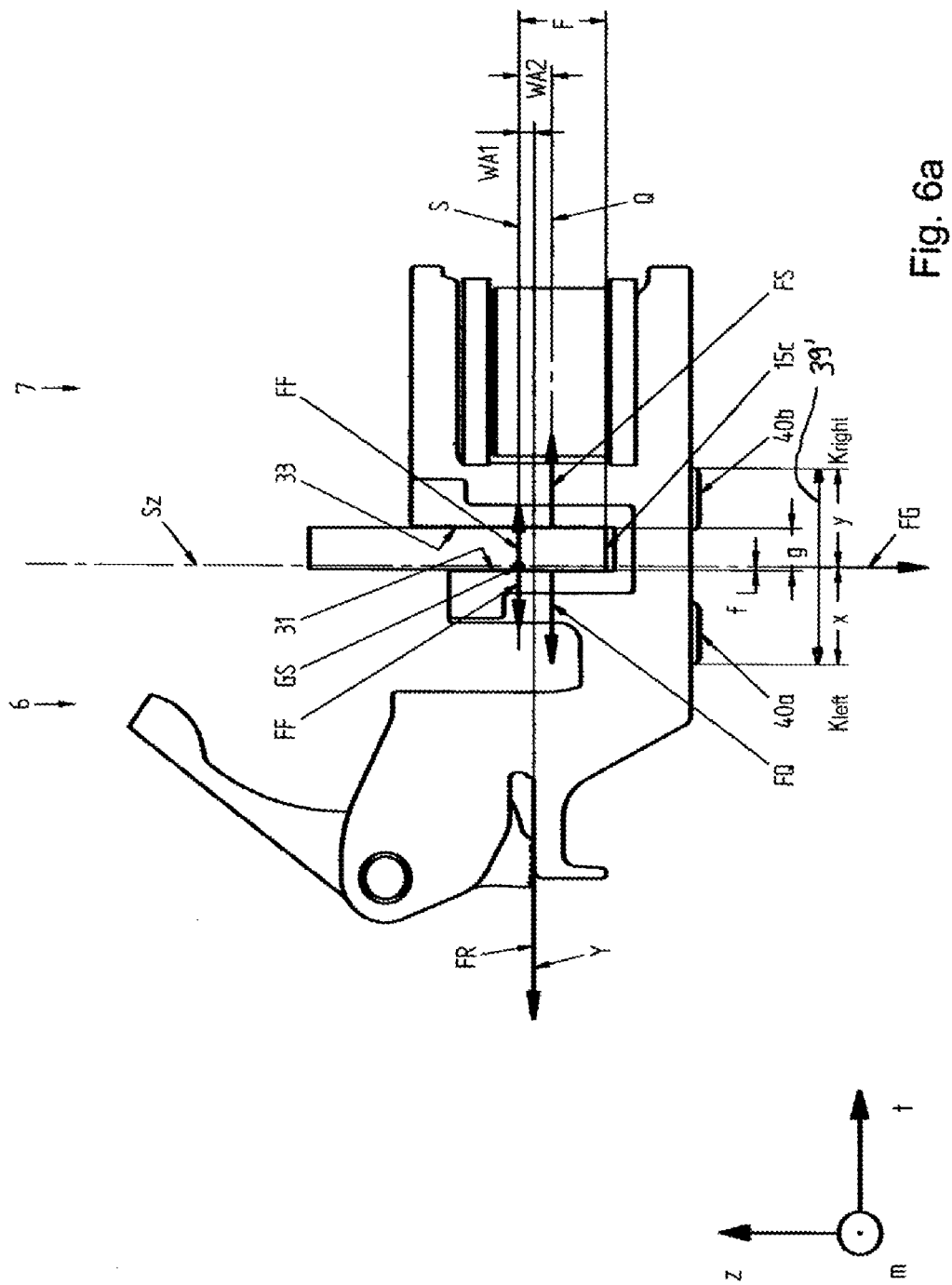
FIG. 6a is a schematic side view of the clip shown in FIG. 4a along with the forces acting thereon and the planes of action in which these forces occur and act.

The transport chain and thus each clip carriage and each chain link (and thus each clip chain unit KK) has a weight. In FIG. 6a, the weight-dependent force component is distinguished by means of the downwardly extending arrow FG. This gravity vector FG, in other words this gravitational force FG, acts on the centre of gravity GS which, in accordance with the cross-section of FIG. 6a, is located in the groove-shaped recess region 27 for receiving the guide rail 15, specifically in the embodiment shown at a small spacing above the clip table plane and/or film plane or stretching plane Y, described in greater detail in the following. Ideally, the planes S and Y coincide. The centre of gravity GS of the clip chain unit KK is positioned in such a way (or the clip chain unit KK is formed in such a way) that the plane of gravity Sz (extending perpendicular to the plane of the drawing), which passes through the centre of gravity GS, simultaneously extends parallel to the chain force running face 31a and to the stretching force running face 33a. In the embodiment shown, the arrangement is such that this plane of gravity Sz passes through the guide rail in the vertical direction (parallel to the m-z plane) or for example coincides with the chain force running face 31a or the stretching force running face 33a (in the drawings a coordinate along the guide rail 15 is shown as m, a coordinate perpendicular to the guide rail 15 is shown as p, and the normal vector to the coordinates m and t is shown as z, in such a way that the plane formed by the m-z coordinates is the weight symmetry plane Sz extending through the centre of gravity GS). In principle, said plane of gravity Sz could also be arranged extending outside the guide rail 15, in other words with a parallel offset from the position shown in FIG. 6a. The advantages according to the invention can be achieved whenever the weight vector passing through the centre of gravity FG or the centre-of-gravity plane Sz intersects the lower support or weight rail 17 or the running face 17a thereof and thus also the sliding bearings 40, 40a, 40b which slide thereon (described in greater detail below) or the sliding face 39 thereof. This is because a corresponding tilting moment is thereby prevented. The overall construction and overall arrangement is such that the clip chain unit KK is braced in a tilting-moment-free and torque-free manner with respect to the support rail running face 17a of the support and running rail 17 by way of the sliding bearings 40 or 40a, 40b formed or provided on the underside 25f of the clip chain unit KK. In the embodiment shown, two sliding bearings 40, in other words 40a and 40b in the embodiment shown, positioned mutually adjacent transversely to the feed direction of the transport chain 13, are provided on the underside 25f of the clip chain unit KK, and form a weight running face 39 underneath, via which the relevant clip chain unit KK is thus braced on the support rail running face 17a of the support and running rail 17.

The advantages according to the invention are achieved in particular if the system between the clip part 6 and the chain part 7 is correspondingly optimally balanced out. In this case, the centre-of-gravity plane Sz is arranged parallel to the m-z plane within the thickness of the guide rail 15, the horizontal and thus perpendicular spacing of the vertically extending centre-of-gravity plane Sz from the vertically extending chain force running face 31a being shown as f in FIG. 6 and the corresponding horizontal spacing from the vertically extending stretching force running face 33a being shown as g, the values for f and g thus being ≥O. The sliding elements of the gravitational force guidance are positioned a long way outside this plane of gravity, in such a way that no tilting moments can occur. The sliding element system is further improved in such a way that identical or virtually identical contact stresses are achieved symmetrically about the plane of gravity Sz either by way of the spacings x, y or by way of different surface areas.

Chain Longitudinal Force FK

Figure 6B:
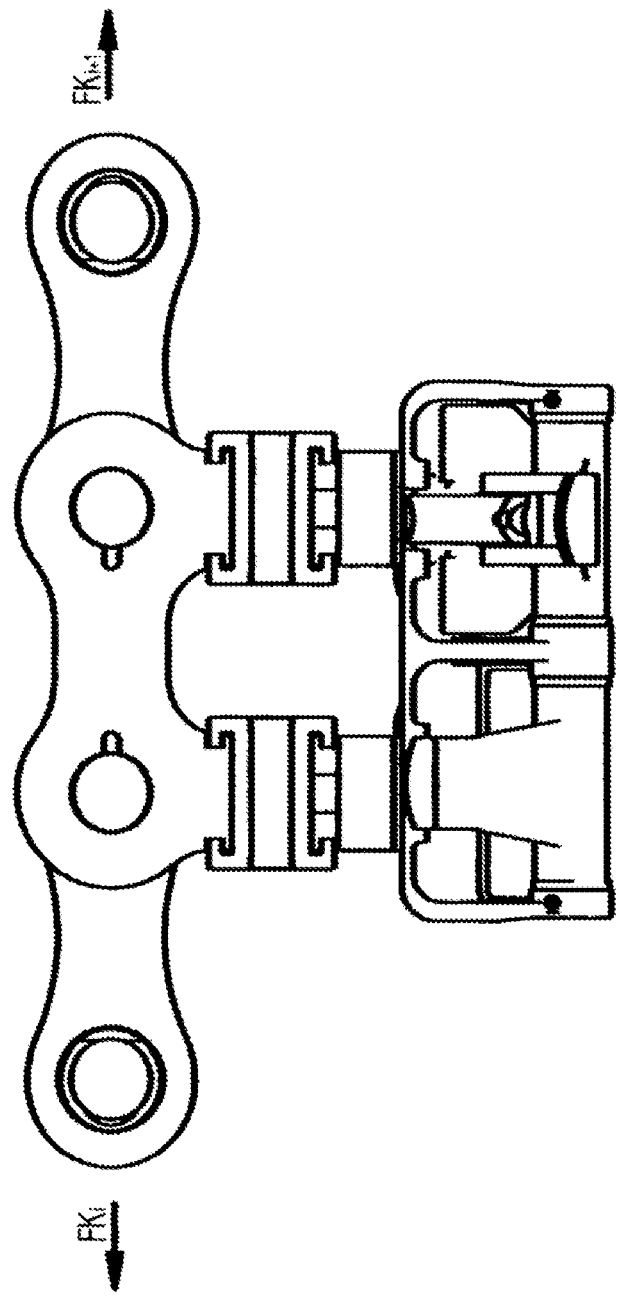

In all regions of the peripheral transport chain 13, there is a chain longitudinal force FKi, where i=1, n, as is shown in FIG. 6b. In a straight portion of the guide rail 15, the forward-moving and returning link elements of the transport chain are oriented straight with respect to one another (in other words at a 180° angle), whilst in convex or concave curved portions, for example in the portions II, III, VI and VII, the force vectors are oriented at at least a slight angle to one another, specifically in accordance with the curvature of the guide rail 15 and around the entrance or exit wheel.

The aforementioned chain longitudinal force FKi is dependent on the chain length (or the weight thereof), the centrifugal tension, the bias, the stretching forces (which are in turn dependent on the film thickness, the film material, the stretching temperature etc.), the stretching angle etc. In other words, the stretching force is different in each chain link depending on the position in the transport system.

In a chain link 6 (chain part 7) constructed symmetrically about a horizontal plane, as a result of the chain longitudinal force, in particular in concave and convex articulations and deflections, the lateral guidance force FS and the transverse force FQ thus defined are exerted on the lateral guidance sliding elements. For a symmetrical construction of the chain, the force plan Q extends in the centre of the small roller, as shown in FIG. 6a.

Resultant Force FR Brought about by the Stretching Force FTD

Predominantly in the guide rail portions VII, V, VI extending divergently outwards from the central plane or plane of symmetry SE, stretching forces additionally act on the relevant clip body 6, and are ultimately introduced via the film to be stretched to the entire clip chain unit KK.

In relation to a clip part 6, the stretching force extension in these zones V, VI, VII additionally brings about a chain force difference having different force components FKi and FKi+1, specifically as a function for example of the expansion behaviour of the polymer in the film F etc. Said chain force difference in relation to a clip part is introduced in the specified zones by a forward-moving or returning chain link adjacent to the clip chain unit KK located in between, and thus to the clip parts 6 located in between. The specific effects brought about as a result are discussed in greater detail below.

Centrifugal Force FF

Corresponding centrifugal forces occur at all of the convex or concave guide rail portions, and are for example directed towards the film to be stretched at the convex rail portion VII and away from the film to be stretched in the concave rail portion VI.

These centrifugal forces act on the centre of gravity GS of the clip chain unit KK, the lateral centrifugal forces FF (merely referred to as centrifugal forces FF for short in the following), which are directed towards or away from the film depending on the curvature of the guide path 2, also being illustrated in FIG. 6a. The centrifugal forces FF are oriented perpendicular to the running faces 31a, 33a (FIG. 6a) and act in a centrifugal force plane S.

Lateral Guidance Force FS

Additionally, in the curved portions II and VI, lateral guide forces FS produced by the chain forces (acting on the chain links) also occur, by way of which the stretching force running face 33 (upper in FIG. 6a) of the clip body is braced on the relevant contact face of the guide rail 15. In other words, on the concave side of the guide rail portion the lateral guidance forces FS are in each case directed away from this arc-shaped guide rail portion. These forces act at the central height of the small roller of the chain links, specifically again perpendicular to the gravitational force of the clip chain unit KK. In other words, these lateral guidance forces FS are braced on the same running face 33a of the sliding body 33 in the clip chain unit KK on which the corresponding stretching forces are also braced.

In addition, corresponding lateral guidance forces also occur at the straight guide path portions Ib, specifically as a result of the tensile forces introduced by the film, which are much lower than the actual stretching forces produced in the stretching zone. The effective stretching forces of the film at the start of the stretching zone, in the actual central region of the stretching zone and the exit region of the stretching zone ultimately also lead to lateral guidance forces, which act on the clip body at the level of the film plane (as will be discussed in greater detail below). These lateral guidance forces FS act in a horizontal plane Q which, for symmetrically formed chain links, is positioned in a plane Q (see FIG. 6a) which is central with respect to the chain links (small roller).

Transverse Forces FQ

The transverse forces FQ are the forces where forces are introduced to the clip body via the chain longitudinal force in the opposite direction counter to the lateral guidance forces FS. Transverse forces FQ of this type are generated in particular in zone III and VII, and act in these portions on the transverse force side face respectively located there. These transverse forces FQ also act on the clip body at the central height of the small roller of the chain links (plane Q in FIG. 6a) (as will be discussed in greater detail below).

In the following, the operating principle will be discussed in greater detail.

The central concept of the invention is based on the fact that in the transport system according to the invention, by contrast with the prior art, there is ideally complete or 100% decoupling of the vertical and horizontal forces. In this context, complete decoupling means that a change in the forces acting or occurring in the horizontal direction does not result in a tilting moment being produced and thus in a change in the total weight loading the support rail and thus to a change or increase in the coefficients of friction. In addition, in the context of the invention, it is intended that at least the weight of the transport chain, in other words the chain links and the clip bodies, be distributed in a balanced-out manner symmetrically about an imaginary weight symmetry plane Sz (FIG. 6a) in relation to the clip part r and the chain part 7. In other words, the weight of the clip part 6 and the weight of the chain part 7 (giving the total weight of the clip chain unit KK) is symmetrical about the imaginary weight symmetry plane Sz and therefore distributed as uniformly as possible with respect to the weight running face 39, the imaginary weight symmetry plane Sz extending through the centre of gravity GS and thus parallel to the running faces 31a, 33a of the sliding block 29. This is intended to ensure that on the one hand no tilting or twisting moments are produced by an asymmetrical weight distribution of the transport chain 13 or the clip chain units KK, and on the other hand the contact stress on the weight running face 39 is distributed as symmetrically as possible about the weight symmetry axis or weight symmetry plane Sz, so as to reduce the coefficients of friction as a whole in relation to the weight. The arrangement as a whole thus prevents or at least largely ensures that, as stated, no tilting moments or torques, which would otherwise lead to an increase in the frictional forces during the advance of the transport chain, act on the transport chain and the clip body.

The invention thus involves a decoupled, and thus tilting-moment-free and torque-free, configuration and arrangement of the clip chain unit KK with respect to the guide rail 15 and the weight support rail 17 which receives the weight.

FIG. 6a shows the centre of gravity GS of the clip chain unit KK, which in the embodiment shown comes to be positioned in the region of the guide rail sliding body 29, in other words in the central region thereof. The gravitational force FG, the vector of which is shown in FIG. 6a, acts here. This gravitational force vector FG is positioned in the imaginary weight symmetry plane Sz, which extends perpendicularly to the plane of the drawing and which extends through the clip body in the longitudinal direction in which the clip body is moved along on a straight guide path. The gravitational force vector FG or the imaginary weight symmetry plane Sz thus extends centrally and symmetrically to the sliding bearings 40 provided on the clip underside 25f and thus perpendicularly intersects the sliding running face 39.

All of the further forces acting on the transport chain, the individual links thereof or the clip bodies 6 thereof are oriented perpendicularly to the gravitational force FG as a result of the design principle selected in the context of the invention. However, these further forces are not only oriented perpendicularly to the gravitational force FG, but act on the relevant clip body and thus on the transport chain more or less in the same or approximately the same vertical position, ensuring that these transverse forces do not introduce any additional tiling moment or torque to the clip bodies and thus to the transport chain, so as not to contribute to an increase in the action of friction in this case either.

In this regard, considering for example the peripheral closed guide rail path 2 disclosed in FIG. 5 for one side of the transverse stretching unit, it can thus be established that, in the straight guide path portions 1a, on the return side (in other words when no film is being gripped, transported or stretched on the clip bodies) merely the gravitational force of the transport chain or the gravitational force in the individual clip bodies FG and the chain longitudinal force FK occur. The symmetrical force relationships as illustrated by way of FIGS. 6a and 6b are thus provided. In other words, on these guide path portions 2', no transverse forces occur on the guide rail sliding bearing 29, either on the stretching force running face 33a or on the chain force running face 31a oriented parallel and opposed thereto, since the two clip body halves 6 and 7 (in other words the clip part 6 and the chain part 7) are in equilibrium with one another, or preferably only deviate slightly therefrom, preferably by less than 30%, 20%, 15%, 10%, 8%, 6%, 4% or less than 2%, in particular less than 1%, as a result of the appropriately selected weight distribution transverse to the imaginary weight symmetry plane Sz in relation to the weight running face 39.

In the guide portions Ib, which likewise extend straight, positioned on the film and stretching side, the aforementioned gravitational force FG and the chain longitudinal force FK, which merely acts in the longitudinal direction of the guide path, also act. However, in these regions, the material web to be treated, in other words in particular the film F, is already clamped at the edge 8, and is advanced along the feed direction 1 by the transverse stretching unit by way of the transport chain 13 and stretched in the stretching zone.

In the preheating zone PH, the film F has not yet been stretched. In the heat treatment zone HT downstream from the stretching zone, the stretching has already been carried out and completed. In the regions PH and HT, only comparatively low film forces FR occur in the transverse direction to the guide rail path, and are predominantly brought about by the film weight and/or the residual film tension and take-down tension after stretching. As a result, only comparatively small film stretching forces FR acting transversely to the withdrawal direction 1 of the film F and thus perpendicularly to said guide path portions in the direction of the film F are produced, and only produce a minimal load on the stretching force running face 33.

The aforementioned forces introduced by way of the film weight and/or the residual film tension are introduced by the clamped film edge to the clip body, since the film edge 8 of the film F is held in place on the clip table 25e by the blade flap 25c. These film stretching forces FR introduced via the film F extend in the film plane Y and thus, as a result of a corresponding orientation of the guide rail 15, act perpendicularly on the stretching face running rail 33, in other words at the level of the clip table plane Y, which corresponds to the film plane Y. As a result, no tilting moment on the clip chain unit KK is produced, and thus no additional contact and/or frictional forces on the stretching force running face 33 are produced, and in the absence of tilting they are also not produced on a portion of the opposing chain force running face 31. Since on the one hand, as stated, the film stretching forces FR act perpendicularly on the stretching force running rail 33 of the sliding block 29, and on the other hand are also oriented perpendicularly to the gravitational force FG and thus to the imaginary weight symmetry plane Sz, and thus ultimately intersect the aforementioned chain force running face 33a (and do not run past outside it), the aforementioned tilting moments are prevented. Since the corresponding force preferably acts in the central region of the chain force running face 33a, a highly uniform contact stress is additionally achieved above and below the lateral guidance force plane Y, likewise in turn reducing the occurring frictional forces.

The corresponding relationships are shown in FIG. 7a, in a side view in relation to the clip body (in other words in the direction of the transport chain), and in FIG. 7b, in a plan view.

Figure 8C:
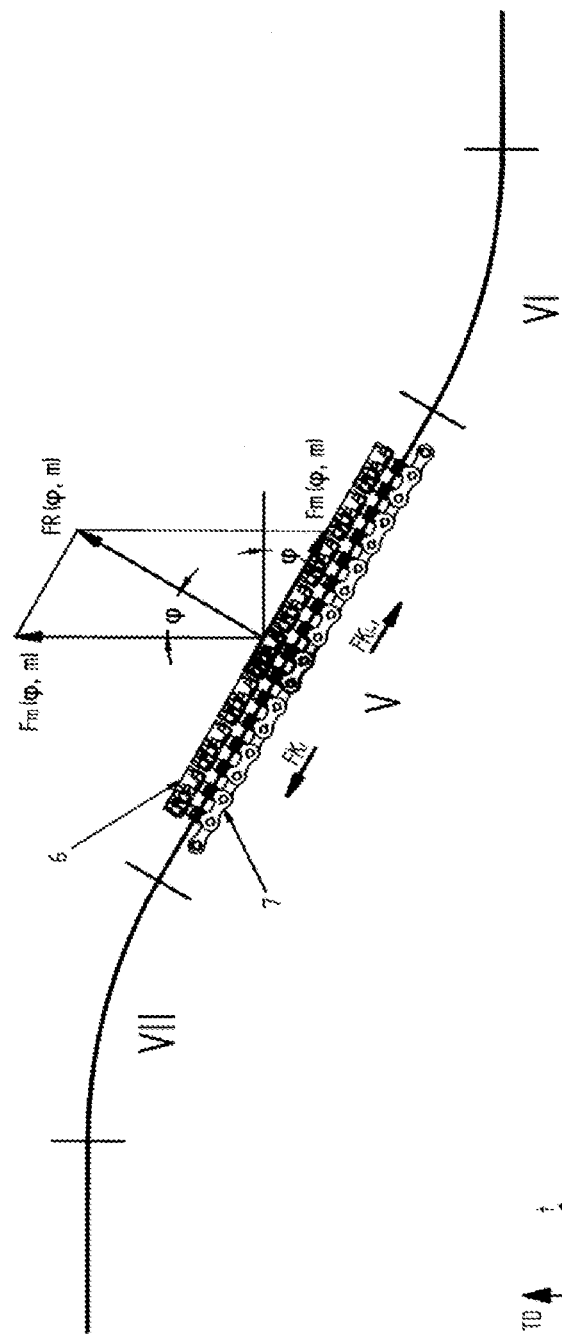

In particular in the actual stretching region R, there are relationships in accordance with FIGS. 8a, 8b and 8c. Aside from the gravitational force FG and the chain longitudinal force FK which is always in effect, here the stretching force FTD in particular occurs, and is indirectly transmitted by sliding elements 33a to the stretching force running face 33. In the context of the invention, the resultant force FR is introduced to the stretching force running face 33a, in other words to the stretching force sliding element 33 provided there, perpendicularly and symmetrically or at least preferably largely symmetrically. The resultant force FR acts primarily—and this is essential—perpendicularly to the gravitational force FG and perpendicularly to the stretching force running face 33a, specifically in turn in the region of this stretching force running face 33a, in such a way that no tilting moment or torque which can act on the clip chain unit KK in the form of tilting is produced as a result. This prevents tilting moments from occurring when the stretching force FTD is introduced to the clip chain unit KK, in particular irrespective of the point in the stretching process at which they occur.

Since the introduction of the stretching force, in other words the resultant stretching force vector FR, is positioned and oriented at the level of the clip table 25e and thus in the plane Y of the clip table or the film, and acts perpendicularly on the stretching force running face 39 in the region thereof, specifically at the level of the plane Y, orienting this stretching force introduction as exactly as possible with respect to the gravitational force FG ensures complete decoupling of the forces, in such a way that the stretching force cannot result in a tilting moment or torque being introduced to the clip chain unit KK. Since no additional tilting moment or torque is introduced to the clip chain unit KK, this also does not bring about any increase, resulting from a tilting moment or torque, in frictional force.

The stretching force plane Y defined by the film plane perpendicularly intersects the running faces 31a and 33a (and is thus also perpendicular to the gravity vector FG), the level of the section between the film plane Y coming to be positioned centrally with respect to the level of the running planes 31a, 33a, in particular the level of the stretching force running plane 33a, or deviating from the ideal central position by less than 30%, in particular less than 20%, 15% 10% or 5% or less than 4%, 3%, 2% or 1% with respect to the total height of said running faces 31a, 33a and in particular of the stretching force running face 33a. In every case, the plane Y always intersects the stretching force running face 33a and preferably also the opposingly oriented chain force running face 31a, so as reliably to prevent the introduction of tilting moments. As a result of the central orientation, as uniform a contact stress as possible is preferably produced, preventing the friction as a whole and a different abrasion or wear.

The resultant force FR is defined as the resultant vector component from the (film) stretching forces in the TD direction (FTD) and in the m direction Fm and the force of the film withdrawal FMD with respect to the stretching angle phi with respect to MD and TD and the position m of the rail path. The coordinate systems are shown schematically in FIG. 8c for the case where the resultant component FR is formed at the stretching angle φ. A piece of film F which is being gripped by the clips 6 and drawn through the furnace together with the chain 6 is shown.

In the regions Ib, these are the forces brought about by the inherent weight of the film prior to the stretching zone and by the inherent weight of the film and the relaxation after the stretching zone.

In the regions V, VI and VII (in other words in the stretching zone), the resultant vector component brought about by the stretching of the film is thus defined from the forces. The resultant component FR is composed in a complex manner from the vector components of the stretching forces in the machine transverse direction TD and the transport direction m and the machine direction and thus the film running direction MD and the stretching angle φ. These depend in turn inter alia on the tension expansion behaviour of the film, on the temperature progression and on the material selection of the polymer. These relationships are known in principle to the person skilled in the art.

In the aforementioned starting stretching region VII (FIG. 5), which is characterised by a rail portion which forms a convex arc portion extending outwards away from the plane of symmetry SE in the withdrawal direction of the film web, the transverse force FQ (discussed in the following) brought about by the chain longitudinal forces occurs, as well as, in addition to the stretching force FTD which also always occurs, a further centrifugal force FF in the direction of the film web. Said centrifugal force FF results from the guidance of the chain about the arc portion VII of the guide rail 15. The aforementioned transverse force FQ is brought about by the chain tension in the transport chain 13, since as a result of the introduced tensile forces in the transport chain the individual chain links on the concave side of the guide rail come into contact with the relevant chain force running face 31 or the sliding elements 31*a* provided there of the guide rail sliding bearing 29, in other words are pressed on there. Thus, depending on the magnitude ratios of the forces FR, FQ and FF, one of the sliding member pairs 15*a*-31*a* or 15*b*-33*a* is loaded.

Figure 9C:
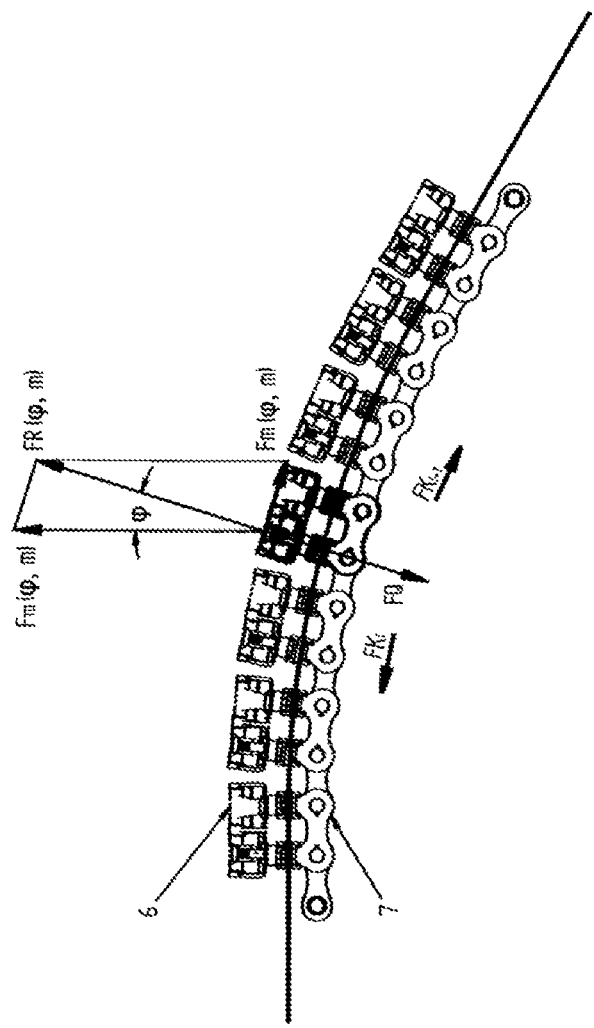

As can also be seen from FIGS. 9*a*, 9*b* and 9*c*, the overall construction is such that both the resultant force FR and the centrifugal force FF occur mutually parallel, in other words in the same or almost the same action plane Y in the embodiment shown, since the centre of gravity GS of the clip chain units KK and/or the other links of the transport chain are preferably positioned in or close to the plane Y=S, which is defined by the clip table 27*e* and thus by the plane of film F. Since the centrifugal forces FF also act at this centre of gravity GS, the centrifugal forces FF thus act in the action plane S (parallel to the action plane Y) at a small width spacing WA1 above the plane Y and the stretching forces RF act in the action plane Y.

As a result of the chain longitudinal forces, the lateral guidance forces FS or the transverse forces FQ are introduced in the concave and convex curved portions, specifically likewise again parallel to the stretching force or to the centrifugal force. The action plane Q is also shown in FIG. 6*a*, and passes through the corresponding chain links or the small roller 13.5 centrally and thus parallel to the stretching force or to the stretching force vector or centrifugal force vector (and thus parallel to the action planes Y and S), in the embodiment shown at a small spacing below the stretching force plane Y. The transverse force FQ or the lateral guidance force FS is directed counter to the centrifugal force and acts at least approximately centrally on the sliding faces 31*a* and 33*a*. Since the action points of these forces, which are oriented counter to one another in part and transversely to the gravitational force FG and which act in parallel planes, act on action points having a vertical spacing positioned at or close to one another, all of the aforementioned force vectors are not only oriented perpendicularly to the relevant running faces 31, 33 but actually intersect said running faces, preferably intersecting them centrally or deviating therefrom by preferably less than 30%, in particular less than 20%, 15%, 10% or 5% or less than 4%, 3%, 2% or 1% (in other words merely having a small spacing from one another), and these force vectors are further perpendicular to the gravitational force FG, there are thus no or virtually no transverse forces or tilting forces produced which act on the clip bodies.

The transverse forces FQ or lateral guidance forces act in a central plane Q perpendicular to the small roller 13.5 of the chain members (for a symmetrical construction of the chain), specifically centrally with respect to the vertical height of the chain (in other words for example centrally with respect to the vertical height of the outer sleeve 13.5). The transverse force acts on the chain force running face 31 in convex portions, as long as the counter forces as a whole are not larger, in such a way that the forces which act transversely to the gravitational force and which compensate in part, in other words which are directed opposingly, result in merely a residual force, resulting from the difference, being perpendicularly braced on the chain force running face 33 or the chain force running face 31, preferably in the central region of the running faces 31, 33 with respect to the vertical height thereof. As well as the stretching force plane Y and the lateral centrifugal force plane S, FIG. 6*a* also shows the transverse force and lateral force plane Q, and the action spacings WA1 between the stretching force plane Y and the plane of gravity S or the action force spacing WA2 between the stretching force plane Y and the transverse force plane Q. Said action force spacings WA1 and/or WA2 are preferably 0, but may also be provided to a preferably comparatively low extent.

The transport system described is distinguished inter alia in that the clip chain unit KK is formed in such a way that
  the centrifugal force plane S extends parallel to the stretching force plane Y at a gravity action spacing WA1,
  the transverse force or lateral guidance force plane Q extends parallel to the stretching force plane Y at a force action spacing WA2, and
  a spacing AF provided between the plane of gravity S and the lower edge 15*c* of the guide rail 15 is at least twice as large and preferably at least three times, four times or at least five times as large as the larger of the two action spacings WA1 and WA2.

However, the transport system may equally be formed in such a way that the clip chain unit KK and the guide rail 15 are formed in such a way that
  the centrifugal force plane S and/or the transverse force or lateral guidance force plane Q coincide with the stretching force plane Y, and
  a spacing AF between the plane of gravity S and/or the lower edge 15*c* of the guide rail 15 is dimensioned in such a way that it is at least 1 mm, preferably at least 5 mm, 10 mm, 20 mm, 30 mm, 40 mm, 50 mm or more.

In the embodiment shown, the vertical extent (perpendicular to the film plane Y of the action spacing WA1 and/or WA2 is less than 30%, in particular less than 25%, 20%, 15%, 10%, 8%, 6%, 5%, 4%, 3%, 2% and in particular less than 1% of the height, extending perpendicularly to the film plane Y and/or parallel to the weight vector FG, of the chain force running face 31 and/or 33.

This likewise prevents the possibility of an increase in the frictional forces, resulting from torque.

As can be seen from the drawings, the height of the chain force running face 31*a* and the height of the stretching force running face 33 may be formed completely differently. All that is of decisive importance is that the stretching, transverse, lateral guidance and/or lateral centrifugal forces acting hereon perpendicularly to the gravitational forces FG act in the region of the chain force running face 31*a* or the stretching force running face 33*a*, especially that the associated vectors act in a shared plane or in planes positioned close together, in such a way that tiling moments or torques which would otherwise occur and which might act on the clip body 6 and thus on the transport chain 13 are prevented or reduced as much as possible. The corresponding relationships are shown in FIG. 9*a*, and by way of FIG. 9*c* as regards the forces and force vectors acting on the clip bodies.

Therefore, the drawings also further show a chain force running face height 231 and a stretching force running face height 233 (for example FIG. 6), which describe the respective heights or effective heights of the lowest to uppermost point of the respective sliding face 31*a* or 33*a* (this sliding face need not be continuous from the lowest to the uppermost point, but may comprise sliding faces formed at a distance from one another to form a free gap). All that is of decisive importance is the effective overall height of the respective chain force or stretching force running face height 231 or 233, which is braced on the corresponding running face or outer face 15*a*, 15*b* of the guide rail 15 and thus interacts therewith. Specifically, apart from the gravitational force FB, all further occurring forces extending perpendicularly thereto should act in this region, in such a way that in this case too no tilting moments and torques can be introduced to the guide rail. In other words, all forces acting perpendicularly on the guide faces or sliding faces here should be braced on the guide rail in a tilting-moment-free and torque-free manner, just like the gravitational force FG which acts perpendicularly thereto and is to be braced on the support and weight rail 17 in a tiltingmoment-free and torque-free manner, in that this weight vector also intersects the corresponding running face 17a of the support rail 17 in the region of the effective sliding face 139 formed there.

In the embodiment shown, the two running faces 31a, 33a which are to face one another start at a common lower height at the lower edge 15c of the guide rail 15, the chain force running face 31 ending lower, in other words closer to the lower sliding face 39, than the chain force running face 33a, which is thus configured with a greater height overall. The higher configuration of this chain force running face 33a provides that the overall larger or maximum forces acting thereon (by comparison with the maximum forces acting on the opposing chain force running face 31a) can be absorbed via the higher sliding element 33, making it possible to reduce the contact stress forces. In principle, the chain force running face 31a of a smaller height and the chain force running face 33a of a larger height may be arranged symmetrically about a central horizontal plane. However, in the embodiment shown said faces start at the same lower vertical position, specifically at the lower edge 15c of the guide rail 15, and end in different vertical positions at the upper free ends thereof.

Figure 10C:
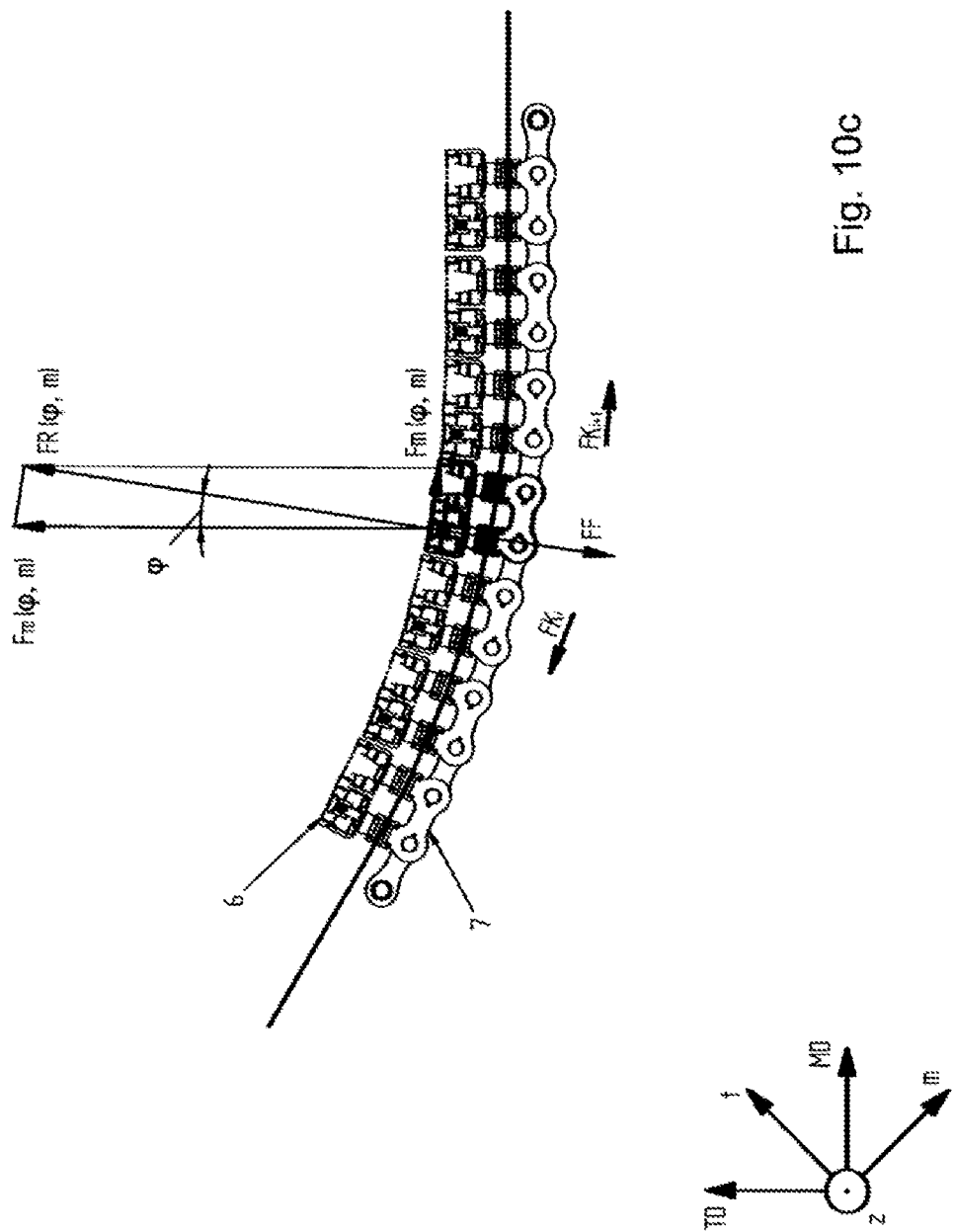

The relationships are reversed in the corresponding concave guide rail portion VI at the end of the stretching zone in the transition to the heat treatment zone 1b. The corresponding relationships are shown in FIGS. 10a and 10b, and by way of FIG. 10c as regards the acting forces and force vectors.

It can thus be seen that, in the corresponding concave guide rail portion VI of the concavely formed stretching zone arc, as a result of the chain longitudinal force, a lateral guidance force FS which is thus defined occurs, and provides, in addition to the resultant force FR, that the stretching force running face 33a of the sliding element 33 is loaded. The region VI is the most heavily loaded region, and can be reduced by further measures such as magnetic relief. In this case, as well as the gravitational force FG which is always in effect, two force vectors act on the transport chain 13, in other words on the respectively relevant clip body 6, specifically both the resultant force FR and the lateral guidance force FS. However, in spite of the different forces which occur, these two last-mentioned force vectors act in turn on the relevant clip chain unit KK on the stretching force running face 33a, specifically in turn preferably in planes positioned close together, specifically in the stretching plane Y, which is defined by the clip table or the position of the film and is positioned in the plane Q which extends centrally through the chain links and in the small roller, and thus at a small action spacing WA2 below the film stretching force plane Y. The centrifugal forces FF, which are likewise directed outwards away from the film web F in this curved spacing, act parallel to the lateral guidance forces FS, specifically at a small action spacing WA1 above the stretching film action force plane Y. Since these forces additionally intersect the running faces 31a, 33a (preferably in the central region thereof corresponding to the aforementioned small spacings WA1 and WA2), and thus perpendicularly intersect the running faces 31, 33a and also the gravitational force vector FG, this also overall produces a force compensation, ensuring that no or virtually no tilting moments or torques are introduced to the clip chain unit KK by the acting forces, thus ensuring that a torque-dependent increase in coefficients of friction and sliding friction also cannot occur in this guide path portion.

Finally, corresponding force relationships without film forces or stretching forces also occur at the concave guide rail portions II, at the convex guide rail portions III, and at the deflection points IV, both at the entrance and at the exit, but without corresponding film forces or stretching forces being effective here. Merely for completeness, it is noted that there need not necessarily merely be a straight guide rail portion provided between the entrance and the exit in the corresponding stretching zone. So as to be able to set different stretching relationships here, further convex or concave guide rail portions may also additionally be provided in this region, potentially also comprising one or more articulations, so as to be able to set different stretching relationships. In any case, forces relationships always occur such as were discussed on the basis of the stretching guide portion V in the region of the stretching zone for a straight guide rail portion or for a guide rail portion oriented convexly or concavely with respect to the film.

As a regards the described variants which may occur over the entire course of the guide rail 15, a table summary is provided below.

|  | Zone | | | | | | | |
|---|---|---|---|---|---|---|---|---|
|  | Ia | Ib | II | III | IV | V | VI | VII |
| Gravitational force FG | + | + | + | + | + | + | + | + |
| Chain longitudinal force FK | + | + | + | + | + | + | + | + |
| Resultant force FR | − | +(1) | − | − | − | + | + | + |
| Centrifugal force FF | − | − | + | + | + | − | + | + |
| Lateral guidance force FS | − | − | + | − | − | +(2) | + | − |
| Transverse force FQ | − | − | − | + | − | +(2) | − | + |

(1) Film force in preheating and relaxation zone negligible
(2) Slight tilting of the clip chain unit about a vertical axis z
(3) Negligible Since, as stated, forces acting counter to the clip chain unit KK in part, in other words for example lateral guidance forces as well as opposingly acting transverse forces, and also frictional forces, centrifugal forces etc. may apply, which running face of the guide rail sliding bearing 29 is loaded under pressure in planar contact with the associated face of the guide face 15 is also dependent on the size of the opposingly acting forces here.

The disclosed embodiments primarily demonstrate that, in the context of the invention, the construction is selected in such a way that all of the relevant forces act on the clip chain unit KK, in other words on the clip part 5 and the chain part 7, in a decoupled manner, causing the desired positive effects to be achieved. The arrangement is such that no or no significant tilting moments and torques are introduced which might act on the sliding faces in a disadvantageous manner.

Because of the favourable force introduction, the sliding elements can always be in exact and complete planar contact or be in planar contact in large parts. The weight running face is always positioned in a neatly planar manner, since the favourable centre of gravity prevents tilting of the sliding body. In all of the other regions too, the weight running block is always in planar contact, since all of the lateral guidance forces do not cause any tipping (in other words no edge loads). The same is the case for the lateral guidance rail. Planar contact is always guaranteed. In the curves, Hertzian contact stress becomes significant, and represents a very significant improvement in particular in tribological terms.

Therefore, a bracing device for absorbing torques and tilting moments is also no longer necessary in the context of the solution according to the invention (but does generally have to be provided in the prior art). Therefore, the disclosed solution is also referred to as a clip and rail arrangement without torque support.

The invention is therefore basically distinguished by one or more of the features, advantages and/or effects listed below, namely:

the invention involves a balanced-out system in which the clip transport unit or specifically the clip chain unit is balanced out in such a way that the respective clip part and the chain part (sometimes also referred to as a transport part) which forms a component of the transport chain are accordingly in equilibrium, as described, with respect to the guide rail;

in most portions of the peripheral path of the transport system only gravitational forces acting on the guide rail occur; in some cases this also makes it possible to dispense with cooling or in particular continuous cooling on this peripheral path, or merely to provide cooling for the frictional forces produced by the gravitational force and the resulting heating, for example in particular portions of the support rail 17, whilst relief or cooling of the lateral guide rail is potentially only necessary or advantageous in specific even shorter regions;

if cooling of this type is provided, it may be in the form of direct cooling;

in the context of the invention, decoupling is provided between the gravitational force and the other forces acting on the clip chain unit, the stretching forces, chain longitudinal forces, centrifugal forces acting on the clip chain unit (and occurring as a function of the different portions of the peripheral guide path), in other words all of the forces of which the vectors extend outside the transport device, are absorbed by the lateral running faces of the guide rail and introduced into the guide faces; as a result, no tilting of the arrangement occurs; there are thus no additional bracing forces which have to be absorbed; thus, a defined planar contact of the sliding elements can also be ensured; all of the forces thus occur within the guide faces of the guide rail;

because of the advantageous introduction of force, it can thus further be ensured that the sliding elements are always positioned on the running and sliding faces of the guide rails exactly and over as much of the surface area as possible or are in planar contact at least in large parts;

in the context of the invention, the weight running face is always positioned on the support and/or weight running rail exactly and over as much of the surface area as possible, since it is ensured that tilting of the one or more sliding bodies on the support rail or support rail face is prevented as a result of a correspondingly favourable selection of the centre of gravity of the clip chain unit;

the provided weight running block is also always positioned in a planar manner on the support and weight rail in all other regions on the peripheral path (where the guide rail is provided), since all of the lateral guidance forces do not cause any tilting (meaning that edge loads are thus prevented); the same is the case for the guide rail and the associated lateral running or sliding faces, since apart from in the curves, planar contact of the sliding bearings (sliding block) on the chain force running or sliding face or the stretching force running or sliding face is always ensured; in the curves, Hertzian contact stress also additionally ceases, an extremely important point which represents a very large improvement in tribological terms;

finally, in the context of the invention, the overall construction is implemented in such a way that the introduced forces, in particular the further forces (for example stretching force, centrifugal force etc.) occurring perpendicularly to the gravitational force, do not lead to elevation factors; an elevation factor can occur if the corresponding forces are not introduced directly into one of the two running faces of the guide rail, since in this case only this force has to be correspondingly braced; however, if corresponding forces acting transversely to the gravitational force are not introduced directly into the running or sliding faces of the guide rail, this results in additional forces which have to be absorbed and braced, meaning that the friction and thus the energy input are increased, further cooling has to be provided etc., finally, it is noted that the spacing between the chain force running face 31 and the stretching force running face 33, in other words the width of the guide rail 15 in relation to the maximum spacing measurement in the same direction between the furthest sliding element edges 40', is much smaller on the at least one sliding bearing 40 or the at least two provided sliding bearings 40a, 40b. In the embodiment shown, the spacing between the furthest sliding element edges 40' (in other words the maximum extension width 39' of the bracing face arrangement 39 which is formed by the contact face of the sliding elements on the support rail 17) is at least twice as large, preferably at least three times as large, as the width of the guide rail 15, with respect to the width of the guide rail 15 and the spacing between the two running faces 31, 33. Since, in addition, the two running faces 31, 33 preferably intersect in the central region of the weight running face 39, in other words in the central region between the furthest sliding element edges 40' (or deviate by no more than 5%, 10%, 15%, 20%, 25%, 30%, 35% or no more than 40% with respect to the total extension width between the two sliding element edges 40'), it is reliably prevented that no tilting moments or torques additionally occur and cannot act on the support face 17 in addition to the gravitational force, which would worsen the friction and energy levels etc.

Chain Longitudinal Force Decoupling

On the basis of the described embodiments, it has already been shown that the chain longitudinal force acts in all regions, but is dependent on the chain length (weight), the centrifugal forces, the bias, the stretching forces (which are in turn dependent on the film thickness, the film material, the stretching temperature etc.), the stretching angle etc. Therefore, the stretching force acts differently in each chain link depending on the position in the transport system.

Figure 11:
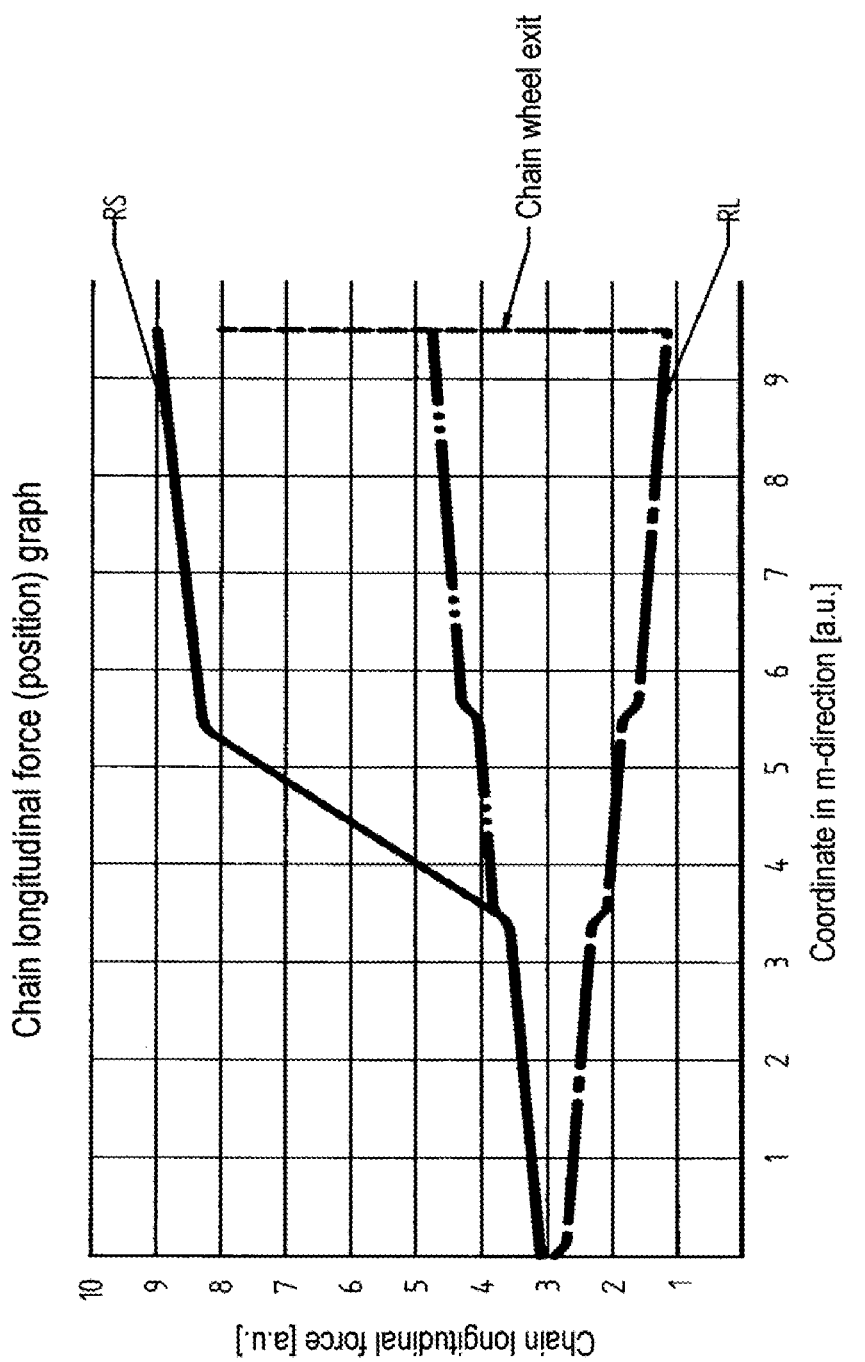
FIG. 11 is a graph of the position of the longitudinal chain force to show the forces acting on the clips.

This dependence of the chain longitudinal force on the position can also be seen in particular from the diagram of FIG. 11. From this, it can be seen that the chain longitudinal force is largest at the drive of the exit region A, since the entire transport chain 13 is being pulled by the driven exit wheel. Depending on the entrance wheel provided in the entrance region E, which may be driven at a partial load, the relationships of the chain length forces at the exit and entrance change.

Upon starting, the aforementioned drives (exiting and at part-load operation in the entrance region) thus have to overcome the gravitational force on the transport chain and the friction occurring between the transport chain and in particular the support rail 17. If the transport chain 13 is at the final speed thereof, it can be operated without further losses (if the entire system is driven without film, in other words operated without the occurrence of stretching forces), since merely the very low frictional forces have to be overcome. This means that corresponding energy merely has to be expended to compensate the friction. Therefore, a linear progression of the occurring chain longitudinal force (the dashed line in FIG. 11) would intrinsically be expected in the advance region Ib and in the regions V, VI and VII in FIG. 5, as long as no further losses, in particular at the arc guidance portions of the guide 15, and no losses at the articulations, chain edges etc. occur in the system as a whole. A deviation from this linear progression would indicate a system which is not decoupled, since in this case losses for example due to friction at the lateral guidance running faces, in other words at the chain force running faces 31 and/or the stretching force running face 33, would occur. This can be detected by measuring the motor torque.

The same also applies in principle for the return region.

If transverse stretching is carried out in the unit, the chain longitudinal force has to increase greatly in accordance with the tension expansion behaviour of the films, in particular in the stretching zone regions V, VI, VII.

Embodiment of the Weight Running Face

It has already been mentioned in relation to FIG. 4a and FIG. 6a that a sliding device, in particular in the form of at least one sliding element 40, in the embodiment shown in the form of two sliding elements 40a, 40b positioned transversely side by side, is provided at the clip chain unit KK on the underside thereof, defining a lower bracing face 39, in the context of which sliding elements 40, in other words 40a and 40b, are braced on the support and running rail 17, in other words on the support and running rail 17' thus formed, and moved in a longitudinally displaceable manner thereon by means of the transport chain 13. For the aforementioned sliding elements 40a, 40b, any elements may be used which have a particularly good coefficient of sliding friction, in other words as low a coefficient of friction as possible, whilst merely being subject to extremely low wear in so far as possible. Therefore, all known sliding materials may in principle be used. Just polyetheretherketone, carbon, graphite active material etc. are mentioned here by way of example.

Plastics materials are therefore conceivable as an embodiment of the weight running faces and lateral running faces and thus for the sliding elements, and may for example consist of or comprise thermoplastics or thermosets. The thermoplastics or thermosets may be of the following compositions or comprise the following proportions:

fibres of all types for reinforcement (proportion of from 0% to 100%), for example in the form of carbon fibres, glass fibres etc., solid lubricants of all types (proportion of from 0% to 100%), for example in the form of graphite, molybdenum disulphide etc., coatings of all types, for example plastics materials, metals etc., surface treatments of all types, for example using gases, radiation, thermal, electrical etc., mechanical surface treatments, for example by turning, milling etc.

The aforementioned sliding elements may also consist of or comprise combinations of thermoplastics and thermosets, whilst also taking into account the aforementioned supplementary explanations and additions, in other words additionally taking into account further above-mentioned combinations or materials.

Since the described occurring forces which act on the clip chain unit KK are fully decoupled (or maximally decoupled and thus minimised), and since the occurrence of tilting moments is prevented, the invention desirably ensures that the at least one sliding element 40 or the for example two sliding elements 40a and 40b provided on the underside of the clip and the bracing face 39 formed thereby produce an even contact stress over the entire bracing face 39, since the corresponding sliding faces or sliding face portions are positioned symmetrically about the imaginary weight symmetry axis Sz. Since the other introduced forces also do not produce any tilting moments or torques, this does not lead to undesirable tilting and one-sided and thus asymmetrical contact stresses, even in use in a wide range of running face portions. The desired uniform contact stresses can be produced in a very simple manner by way of equal or different spacings and/or equal or different-sized surfaces. It should further be noted that the coefficient of friction is generally dependent on the contact stress. The coefficient of friction generally decreases with increasing contact stress until reaching an optimum value. After reaching the optimum value, the coefficient of friction increases again or the very high contact stress leads to failure of the material used. The specific friction loss (heat per unit area) increases for a constant friction loss and decreasing surface area. High specific friction loss additionally places great pressure on the oil used as lubricant (cracking), since the heat is introduced via a smaller contact face.

Thus, larger surfaces relieve the specific heat input into the lubricant used, usually oil. However, a larger surface has a negative effect on the coefficient of friction (which increases), in turn causing the friction loss to increase. There is thus an optimum value for the ideal contact stress, depending on the tribological partner and parameters (temperature, load etc.) and the above-disclosed circumstances.

The problems which occur in connection with reducing friction are also to be clarified by way of the following considerations.

Assuming that a corresponding transverse stretching unit is operated at a speed v1, for this speed the coefficient of friction $\mu$ and the temperature of the sliding member pair both fall to a minimum as the contact stress increases. As the contact stress continues to increase, the coefficient of friction and the temperature of the sliding member pair both increase very rapidly until the sliding member pair fails (the sliding member pair being defined by the interacting materials of the stationary sliding and running faces and of the moving parts interacting therewith). By comparison with a higher speed v2 (v1<v2), the coefficients of friction and the temperature of the sliding member pair both tend to be lower. The curve progression of the coefficients of friction and the curve progression of the temperature of the sliding member pair progress similarly to at low speeds v1 until the sliding member pair fails.

It would therefore be desirable to produce a chain arrangement in which the sliding face can be changed in accordance with the requirements so as to achieve an optimum. The invention therefore provides a solution which provides all of the degrees of freedom for always achieving this optimum or for adapting in accordance with the different requirements.

Figure 12C:
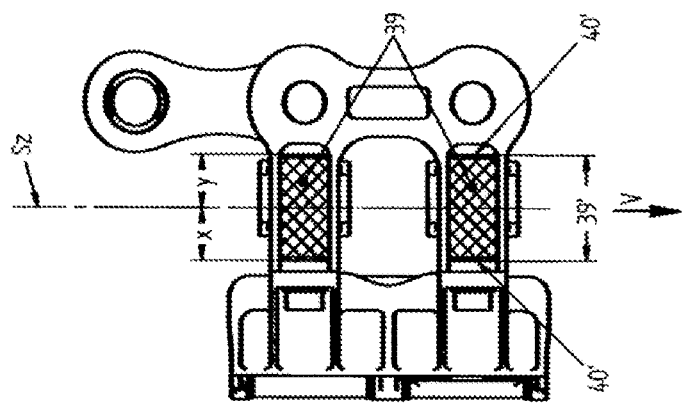
FIGS. 12a to 12c are three views from below of a clip body along with different sliding arrangements formed on the underside thereof.
Figure 12B:
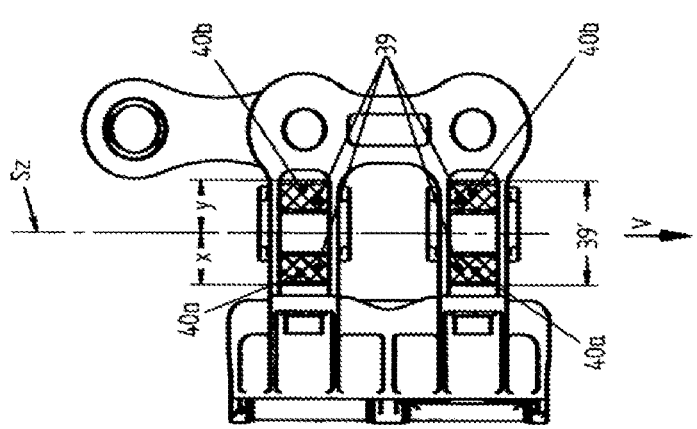
Figure 12A:
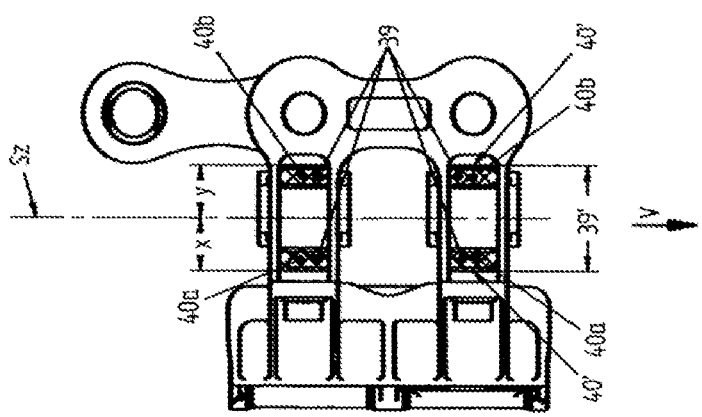

FIGS. 12a to 12c are schematic simplified views from below of three examples of the clip chain unit KK, which clarify how different contact stresses can be implemented in a very simple manner in the context of the invention. In the variant of FIG. 12a, a pair of sliding elements 40a is provided, which elements are preferably each at the central height of the associated chain link axis and are mutually offset in the transverse direction, and are thus arranged transversely and in particular perpendicularly to the feed movement 1 of the transport chain 13. The width of the sliding elements 40, 40a, 40b is comparatively small. As a result of the total surface area, which is thus smaller overall, in the region of the weight running face 39 of said sliding elements, a higher contact stress is achieved. In other words, in this embodiment a total of four sliding elements are used, specifically respectively two pairs of sliding elements 40a and 40b offset transversely to the feed movement 1, meaning that a corresponding bracing face arrangement 39 is produced on the running face 17' of the support rail 17. In the variant of FIG. 12b, the corresponding sliding elements are configured somewhat shorter in the feed direction but wider in the transverse direction. This may lead to an altered contact stress. In the variant of FIG. 12c, respectively only two sliding elements 40 offset in the feed direction 1 are provided, and extend over the entire width to the left and right with respect to the imaginary weight symmetry axis SZ.

Generally speaking, however, the sliding element 40 may also consist of individual or a plurality of sliding elements, which are not interconnected but instead for example are directly formed in corresponding mountings of the clip chain units KK or are an integral component of KK (for example TFE LOK materials).

As a result of this different configuration, the invention does always ensure that the symmetrical arrangement about the centre of gravity or about the virtual weight symmetry axis Sz results in an equal or almost equal contact stress with respect to the sliding elements to the left and right of the weight symmetry axis Sz. As a result of the different shaping and sizing, however, a different contact stress can equally be brought about in a simple manner, meaning that improvement can easily be carried out in this regard.

In all of the embodiments shown in FIGS. 12a to 12c, the maximum extension width 39' of the bracing face arrangement 39 is clearly larger, preferably even many times larger than the width of the guide rails, the extension of which preferably intersects the central region of the maximum extension width 39', in such a way that as a result, for a corresponding described, decoupled overall configuration of the construction, no additional tilting moments and torques are introduced from the clip chain unit KK to the surface, in other words the support and running rail 17' of the support rail 17 (or at least there is no significant relevant increase in the contact stress forces acting here).

The maximum extension width 39' is shown for example in FIG. 6a, and in FIGS. 12a and 12c. It corresponds to the total of the values x+y, x being the spacing between the vertical centre-of-gravity plane Sz and the furthest point of the sliding element 40a on the clip side, and y being the spacing of the centre-of-gravity plane Sz from the furthest point of the sliding element 40b on the chain side. In the region of the maximum extension width 39', a single sliding element 40 or a plurality of sliding elements 40a, 40b arranged at a distance from one another may be provided. The centre-of-gravity plane Sz should preferably pass centrally though the maximum extension width 39' (=x+y). If the centre-of-gravity plane Sz does not pass centrally through this maximum extension width with respect to the sliding elements 40, 40a, 40b, in such a way that the lateral spacing X is different from the lateral spacing Y, the length of the sliding elements should be dimensioned in such a way that the contact stresses are equal with respect to the centre-of-gravity plane Sz. In other words, the (equally large) partial weight forces to the left and right of the centre-of-gravity plane Sz, which act on the furthest points 40a' and 40b' (see FIG. 6a), should thus extend in such a way that the spacing x is different from the spacing y, and so it should be ensured in this case too that the contact stresses to the left and right of the centre-of-gravity plane Sz are equal, with the result that the faces of the sliding element or of the plurality of sliding elements 40a, 40b to the left and right of the centre-of-gravity plane Sz have to be of different sizes. As a result of the adaptation of the sliding face, it can be ensured that the clip chain unit KK does not tilt.

Embodiments Relating to the Lateral Running Faces of the Guide Rail Sliding Bearing Within the context of the invention, improvement can also be carried out in relation to the guide rail sliding bearing 29, in other words the guide rail sliding block 29a.

For better understanding, the following should first be noted.

Figure 13:
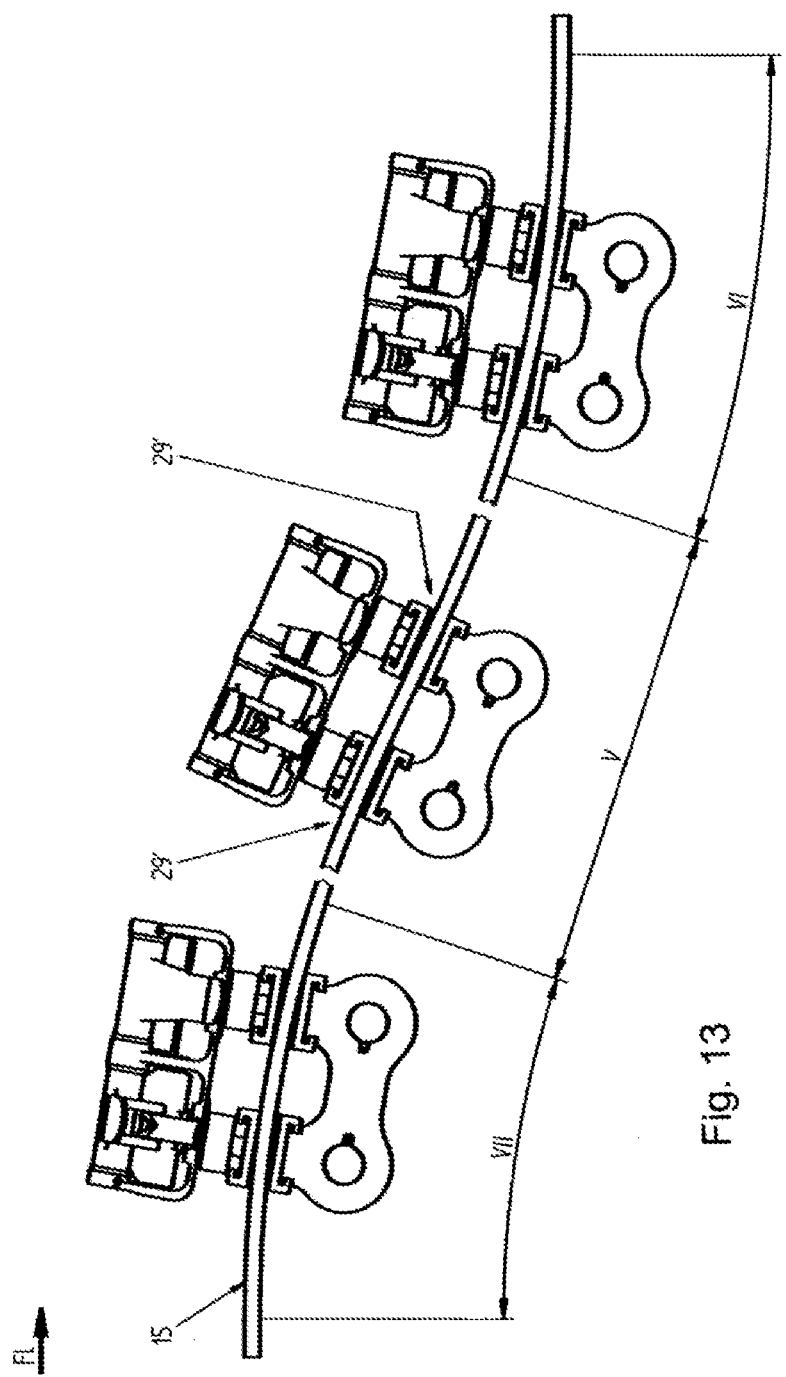
FIG. 13 is an exaggerated detail of the guide path comprising a convex and a concave guide path portion to illustrate that there are no edge loads in any possible contact situations of the lateral guide sliding body; by way of different expansion behaviour of the film, rotation about the z-axis may occur for example in the region V.

It has already been mentioned that a chain longitudinal force, which depends on various factors, acts in all regions of the peripheral path 9 along which the transport chain is advanced in a rotational manner. This comes into effect in particular in the stretching zone, particularly including at the start of the stretching zone having a convex guide rail portion and at the end or exit of the stretching zone having a concave guide rail portion. In particular in these zones V, VI and VII, the stretching force progression causes a difference as regards the occurring chain force at two successive clip chain units KK (for example the force FKi occurring at one clip or chain element and a force FKi+1 occurring at the next element), specifically as a function of the expansion behaviour of the polymer, in other words the film to be stretched. As a result, it is in principle possible for individual clip elements or clip bodies to twist or tilt about an axis of rotation perpendicular to the film web plane Y, in other words a plane oriented perpendicular to the peripheral plane of the transport chain. This effect is shown in an enlarged detail in FIG. 13, a chain link, in other words a clip body 6 under the action of the stretching forces on the film side, being shown for each distance portion V, VI or VII, specifically in a disproportionately large representation which does not occur in practice, so as to clarify the effect in question.

From this, it can be seen that as a result of the additionally introduced stretching forces the individual clip bodies have a tendency to tilt or twist about an axis perpendicular to the plane of the drawing (in other words perpendicular to the plane of the film), specifically in a twist direction in the feed movement of the transport chain having a component directed towards the film, in other words having a tilting moment directed anti-clockwise in relation to the right peripheral path 9, whilst on the opposing left peripheral path 9—with respect to the film located in between—a clockwise tilting or twisting movement is produced.

In the context of the invention, the geometry is configured in such a way (see FIGS. 14 to 16) that in every conceivable chain link position there are as few edge loads as possible. As an example, a U-shaped sliding element 29, for example in the form of a sliding block 29a having the sliding elements 31 and 33, is disclosed here. Generally speaking, however, the sliding element 29 may also be an individual or a plurality of sliding elements 31 and 33, which are not interconnected but instead are for example directly formed in corresponding mountings of the clip chain units KK or are an integral component of KK (for example TFE LOK materials). For this purpose, the sliding element faces 31a and 33a are respectively provided, on the leading face thereof and on the trailing face thereof, with a flattened region or curvature increasing the slight spacing between the two sliding faces. To prevent edge loads, the invention thus provides that the sliding element faces 31a, with respect to the chain force running face 31, and the sliding element faces 33a, with respect to the stretching force running face, on the guide rail sliding bearing 29 (in this case the U-shaped sliding block 29a) are improved as regards a minimum contact stress and large contact face. This is achieved in that, on the leading face 32a and on the trailing face 32b of the guide rail sliding bearing 29 and on the trailing face 32b of the guide rail sliding bearings 31 and 33 (shown in a U-shaped sliding bearing arrangement 29 in this case) respectively, in other words on the vertical entrance edge and the vertical exit edge of a relevant sliding element 31, with respect to the chain force running face 31a, and to the sliding element 33, with respect to the stretching force running face 33a, respectively, a flattened region 32' or 32" is provided (for example having a curvature having a radius 32r1 to 32r2 respectively about a centre-point or a central axis perpendicular to the feed path 2 or to the plane of the film F etc.), meaning that the slight transverse spacing 32d (FIG. 16) between the two running faces 31a, 33a which are to face one another is slightly enlarged. This results in improved contact on the side faces, in other words on the outer faces 15a and 15b, facing away from one another and oriented vertically in the embodiment shown, of the guide rail 15, in other words of the guide rail arrangement.

In other words, in the context of the invention the chain and sliding body geometry is configured in such a way that in any conceivable position (in the transport system) the system always slides on the faces 31a and 33a provided for this purpose. Edge loads are thus prevented. The radii 32r1 and 32r2 at the sliding elements 31 and 33 are improved, in such a way that the contact stress (Hertzian contact stress) is as low as possible. As a result, the specific friction loss on the sliding rails (guide rail 15) is also reduced, minimising the overheating of the oil (flash point) in the sliding film. In summary, it can thus be established that the flattened regions 32' and 32" provided on the guide rail sliding bearings 29 on the entrance and exit side on the two running faces 31a and 33b of the sliding elements 31 and 33, whilst enlarging the spacing gap 32d between the two running faces 31 and 33, are improved in such a way that no edge loads occur, even though the transport chain 13 is located in the diverging stretching zone.

Reference is thus also further made to the accompanying drawings of FIGS. 14 and 15, in which a guide rail sliding bearing 29 is shown in a three-dimensional view on the one hand, and this sliding bearing is shown in a plan view on the other hand. From the further schematic plan view of FIG. 16, relating to a clip chain unit KK having the two sliding blocks 29, 29' mutually offset in the withdrawal direction, it can be seen that a contact point or a contact line 3211 or 3212 is formed on the running faces of the sliding blocks, and leads to contact, which is extremely slightly tilted about a vertical axis, between the two sliding blocks 29 of a clip body 6 and the associated guide rail 15. This contact line 3211 or 3212 is for example more than 1 mm, 2 mm, 3 mm and in particular more than 4 mm from the outer limit 34 of the sliding element. Conversely, these values are preferably no further than 8 mm, 7 mm, 6 mm or 5 mm from the outer limit 34 of the sliding element. For example, for a 75 radius for the sliding element (75 cm), this contact line is for example offset 4.5 mm inwards from the outer edge of the guide rail sliding bearing 29.

It is expressly noted that the invention is not linked to the shape (for example U shape) or size or shaping of the sliding element. In principle, a plurality of sliding elements may also be used on the guide rail side.

In summary, it can thus be established that, in the context of the invention, the running faces 31a, 33a of the guide rail sliding bearings 29 are configured in such a way that no edge loads occur in any conceivable chain link positions, the radius being improved for low contact stress and a large contact face.

Further, in particular in relation to FIG. 14 but also with reference to FIG. 3 and FIG. 6b, it is noted that the sliding block 29 may be formed in one piece and may be provided with guide devices and with undercuts 36, which make it possible to replaceably insert and anchor a sliding block formed in this manner in a corresponding recess in the clip body 6.

Further Improvement of the Unit by Way of Weight Reduction

An improvement in the overall situation, in other words a reduction in the coefficients of friction, a related improvement in the sliding bearing, and potential lubrication and/or reduction in wear can—in addition and as an alternative to the previously disclosed embodiments—also be achieved in that in particular a lightweight construction is implemented for the transport chain 13 as a whole and for the clip chain units KK or at least for parts or similar parts thereof. Thus far, merely steel and other cast materials have been used as standard materials for this purpose.

Therefore, in the context of the presently disclosed embodiment, it is provided that the clip chain units KK or significant components thereof and thus the transport chain 13 for example are made of or consist of lighter materials such as composite materials and in particular fibre composite materials.

The stretching unit according to the invention may be configured in such a way that the clip part 6 and/or the transport part 7 consist of or comprise one or more composite materials, in particular long-fibre fibre composite materials, at more than 25%, in particular more than 30%, 40%, 50%, 60%, 70%, 80% or more than 90%, by volume or by weight.

Further, the stretching unit may be distinguished in that the clip part (6) and/or the transport part (7) comprises at least one composite material comprising at least one matrix material and comprising at least one functional component or property component, a) the at least one matrix component comprising or consisting of one or more of the materials of aluminium, magnesium, ceramics, carbon, thermosetting plastics, elastomers and/or thermoplastics, in particular thermosets, polymers, resins, polyester resins, polyurethane resins, polyurethane, epoxy resins, silicone resins, vinyl ester resins, phenol resins, acrylic resins (PMMA), and b) the property component or functional component comprising or consisting of one or more of the materials of glass fibres, carbon fibres, ceramics fibres, aramid fibres, boron fibres, steel fibres and/or nylon fibres, in particular in a long-fibre configuration.

Construction of a Support and Running Rail Configured According to the Invention The support and/or running rail can already be seen in the cross section of FIG. 2, and consists of or comprises a bulk material, in other words has a rectangular (or other) cross section transverse to the longitudinal direction of the peripheral path 2 in the embodiment shown, specifically having a planar upper support rail running face 17a in the embodiment shown.

So as to require less lubricant in the form of oil (this also contributing to the film to be manufactured using the stretching unit potentially being soiled by oil particles), and equally so as to keep the frictional effect as small as possible, an additional measure for reducing the rise in temperature brought about by the friction may be provided. An essential feature of the invention is the heat dissipation to the whole or particular parts of the peripheral path. In the embodiment shown, the support or running rail 17 comprises a cooling device for this purpose. For this purpose, the support rail 17 is passed through by at least one cooling duct 41, which is flowed through by a flowable coolant, preferably a fluid coolant, for example in the form of water. The support or running face 17a, which is formed on the top of the support or running rail 17 and on which the sliding bearing 40, 40a, 40b located on the underside of the clip body 6 is guided in a longitudinally displaceable manner, is thus cooled directly. This likewise contributes to the heat dissipation and thus to the reduction in wear and to an improvement in the plastics material film to be stretched and further to a longer service life of the unit as a whole. The cooling reduces the overheating of the oil or of the sliding materials.

The guide rail 17 is preferably formed in one piece with the internal cooling duct 41 of the upper support or running face 17a, in other words preferably in a bonded manner, in such a way that the cooling of the support or running rail 17 brought about by the coolant acts as directly as possible on the running and/or sliding face 17a and thus also directly contributes to the cooling of the sliding bearings 40, 40a, 40b provided on the underside of the clip body 6.

In this regard, reference is also further made to FIG. 2, where an insulation 42 is further shown under the cooling rail 41. As a result of this insulation 42 (which may comprise plate-shaped insulating spacers), it is ensured that the cooling effect is effective in particular only on the upward-facing running face 17a, and there is no cooling loss downwards, in other words to the region via which the support and running rail 17 is held and braced. In addition, this spacer 42 which acts as insulation may also be used as a compensation element, so as to compensate support warping. If spacers of this type are merely used at distances from one another below the support rail, in such a way that the portions positioned in between are free, the resulting air also provides insulation.

Articulated Connectors in the Support and Running Rail

The aforementioned guide rail 15 may consist of a single steel strip or for example of a bundle of flexible, continuous spring steel strips, oriented vertically in cross section and arranged horizontally side by side. This results in a possibility for adjusting the guide rail 15.

By means of articulations G of this type, the progression of the guide path 2 can be adjusted in accordance with the desired and optimum specifications, in particular in the region of the stretching zone.

However, this also requires the actual support and running rail 17 to be able to be adjusted accordingly. However, since this support and running rail 17 consists of a solid metal body, which in the context of the invention is preferably configured in the form of an integrated cooling system, in particular in the form of a cooling duct extending along this support and running rail, a specific longitudinal construction has to be implemented here.

On this point, the following makes reference to FIGS. 17 to 22.

Figure 17:
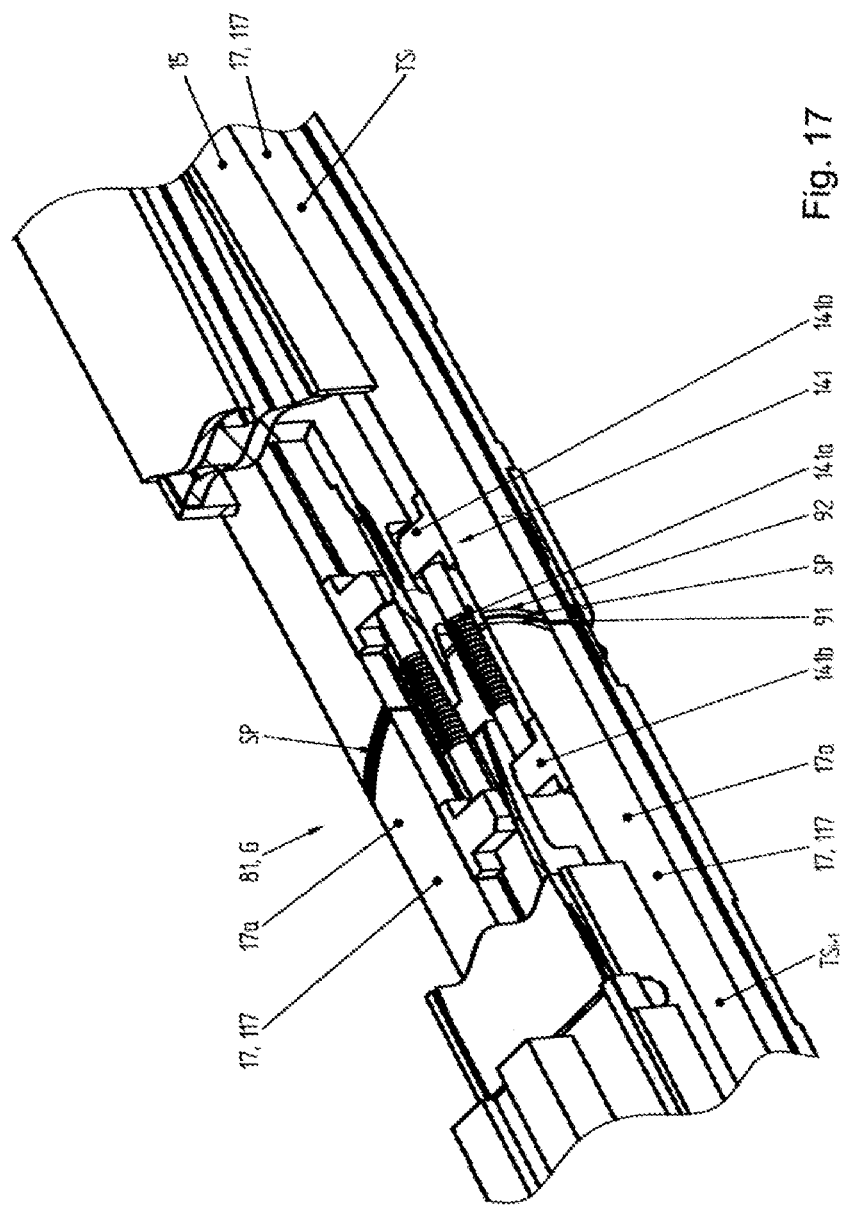
FIGS. 17 to 22 are different sectional views illustrating an articulation formation in the support structure and the support rail, resulting in a very precisely aligned rail transition.
Figure 18:
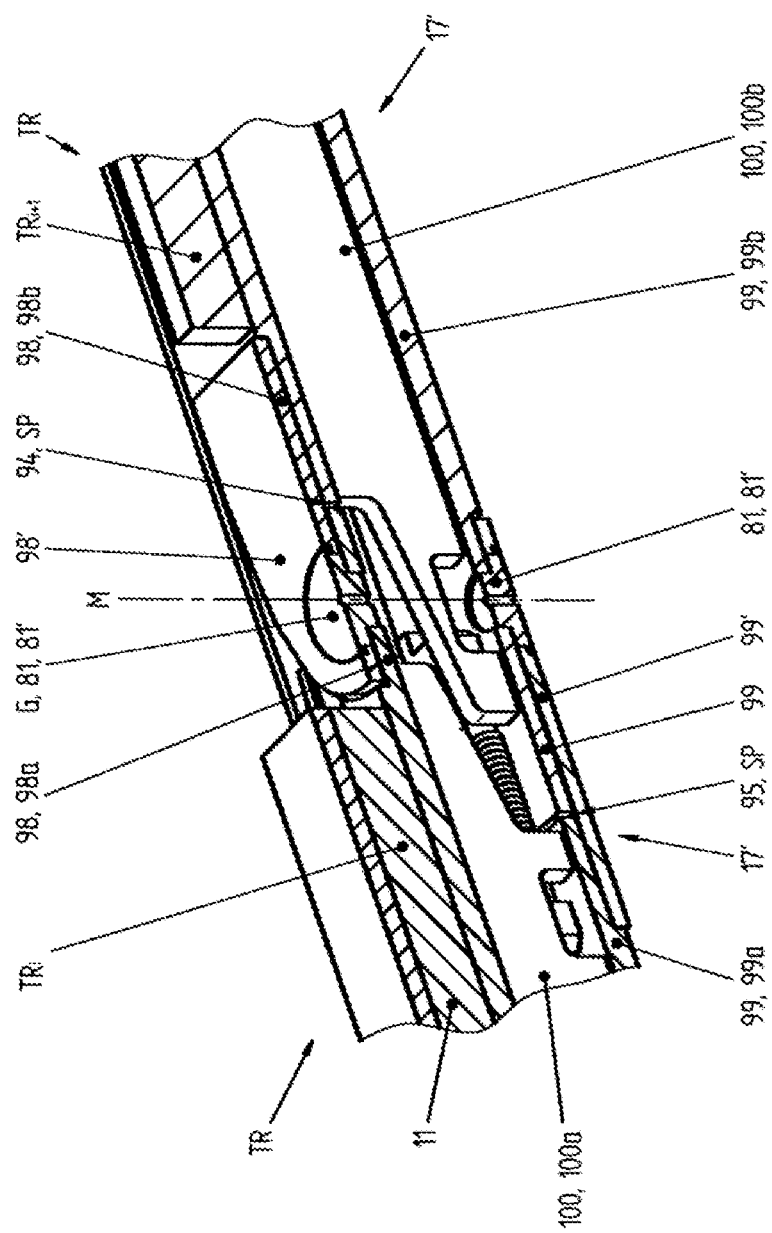
Figure 19:
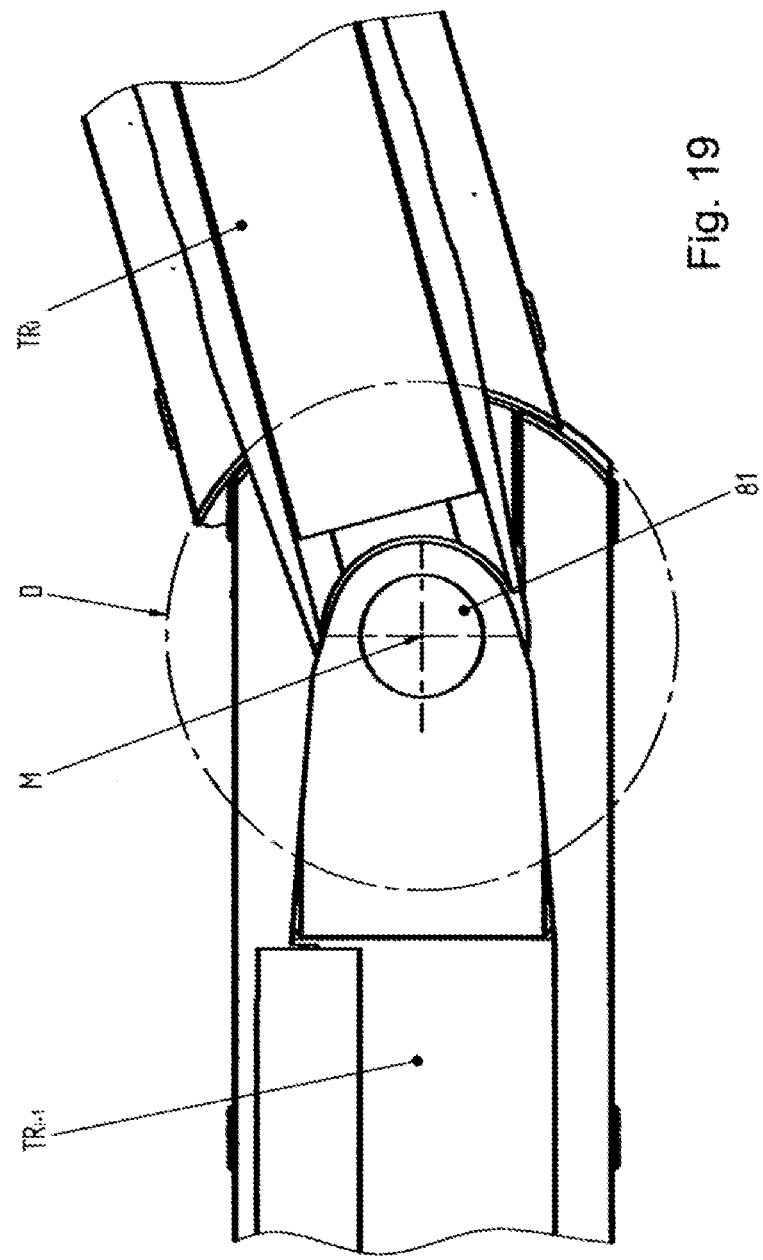
Figure 20:
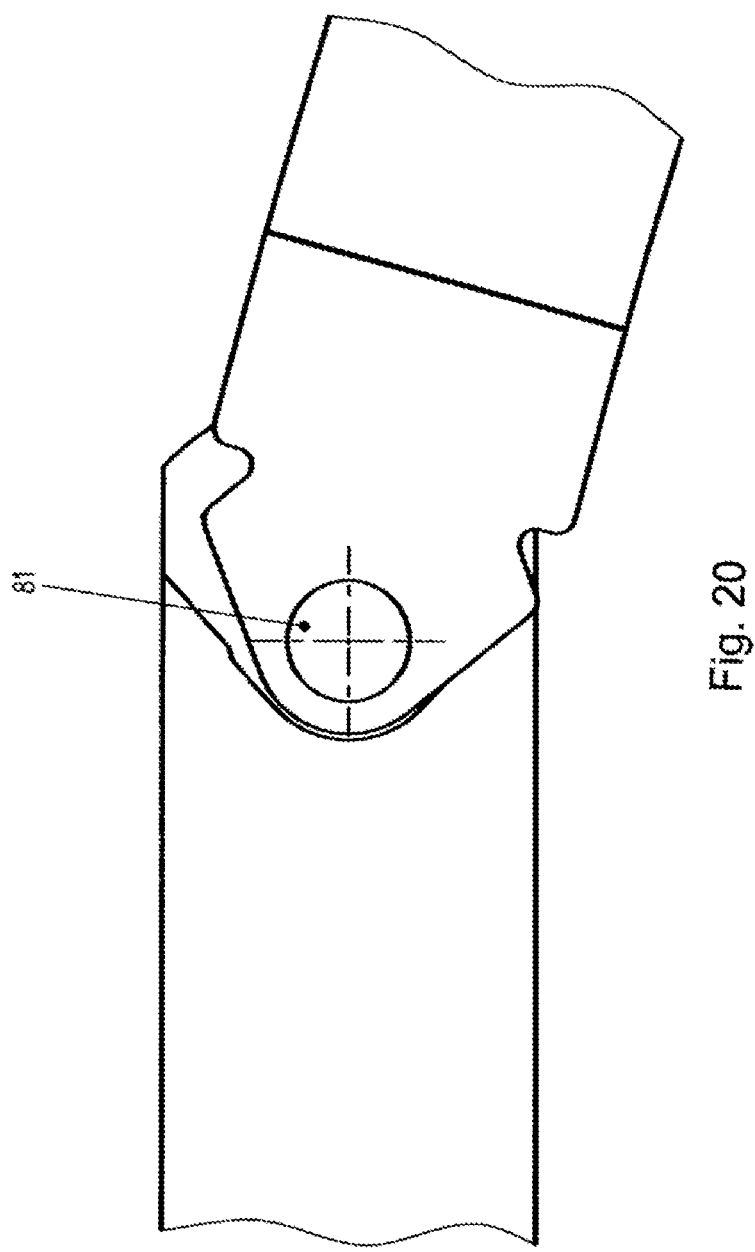
Figure 22:
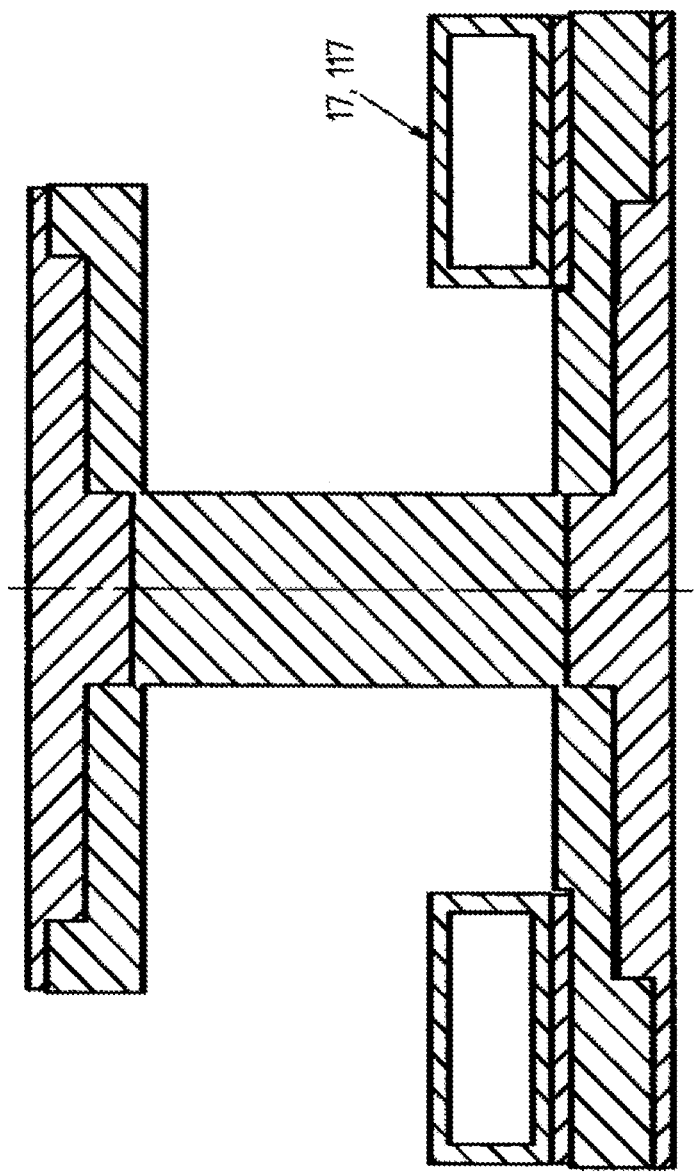

FIGS. 17 and 18 show a corresponding running and support rail 17, in other words having a removed upper support part, and in FIG. 18 in a vertical cross section in the region of an articulation. FIG. 19 is a corresponding plan view, FIG. 20 is a corresponding view from below, and FIG. 21 is a schematic vertical longitudinal sectional view in connection with the articulation arrangement, for illustrating the design principle according to the invention. FIG. 22 is a schematic sectional and partial view, extending transversely to the longitudinal direction of the support and running rail, of this design principle in the region of an articulation.

The design principle explained in detail in the following for the transport system, in other words for the support and/or running rail 17, makes possible variable adaptation to the method process, in other words adaptation to the respectively optimum stretching relationships.

Since the support and/or running rail 17 according to the invention is preferably provided with a cooling device in the form of a cooling duct 41 passing through the support and/or running rail 17 in the longitudinal direction thereof (as explained previously by way of FIG. 2), this also requires a specific articulation construction.

The drawings show an articulated transition G from a first constituent part TSi to a following constituent part TSi+1 of the support and/or running rail 17 or of the support construction 19 as a whole, along with TRi and TRi+1.

On the one hand, it can be seen that the two constituent parts require complete separation from one another, meaning that different sub-aspects creating the separation are to be taken into account.

Initially, the separation of the support rail 17, also referred to as a cooling rail 117, is to be discussed. As stated, the upper face or sliding face 17a of this support or running rail 17, in other words the cooling rail 117, is for bracing the weight running face 39 of the sliding bearing 40, 40a or 40b attached to the underside of the clip chain unit KK.

As a result of the aforementioned separation of two adjacent constituent parts in the support or cooling rail 17, 117, a separating gap SP is initially formed, which in a plan view forms a partial circle about a central articulation axis M. The articulation axis M is perpendicular to the support rail running face 17a, and thus usually perpendicular to the film plane. The corresponding end faces of the two constituent parts of the guide rail are thus formed concave on the one hand and convex on the other hand in a manner corresponding to the partial circle.

The gap width of the separating gap SP should be as small as possible. The constituent parts of the support rail 17, which are adjacent to one another along the gap, are provided with an arrival phase 91 and a departure phase 92 in the region of the support rail face 17a. These phases 91, 92 are improved in such a way that the transition can take place without damage to the air bearing pads 140, in other words to the cushion plate support face 139 (also referred to in the following as the pad running face 139) at the pads 140, and without the action of a moment.

It is further noted that the support rail constituent parts TSi, TSi+) and the articulated connection G, 81, 81' provided in this region are formed warp-free and torsionally rigid so as to maintain a mutually flush support rail running face (17a).

It is additionally provided that the support rail 17 or the support rail constituent parts TRi, TRi+1 are braced and held directly or with the interposition of spacers or insulating spacers 42 on the lower support parts 99.

Since, as stated, a cooling duct 41, in other words a peripheral cooling system, is formed on the support rail 17, a separate connection device 141 has to be provided via which the cooling duct portions TSi and TSi+1 are interconnected via the gap SP.

It can be seen in particular from FIGS. 17 and 18 that the two constituent parts TSi and TSi+1 of the support and/or running rail 17 are provided, adjacent to the gap SP, with a transverse duct piece 141a, via which a bypass line 141 is connected. In other words, the coolant circulating in the cooling duct 41 in one constituent part TSi of the support rail 17 can subsequently flow onwards via a bypass line 141a, by way of the connector pieces 141b, into the next cooling duct portion TSi+1 of the support rail 17. As stated, the end faces of the relevant constituent parts of the support and/or running rail 17 end adjacent to the gap SP.

So as to ensure the aforementioned seamless transition between the two constituent parts TSi, TSi+1 of the support rail 17, the support structures (as can be seen for example in FIGS. 17 and 18), in other words the successive support structures TR comprising the constituent parts TRi and TRi+

1, to which the weight running face construction 17 is fixed, have to be connected at a corresponding torsional rigidity and bending moment rigidity. For this purpose, in the drawings, the articulation axis M and the joints 94 and 95 are shown forming the separating gap SP in the support parts. For improved clarity, the cooling ducts are not also shown here.

So as to achieve sufficient torsional rigidity and thus also sufficient bending moment strength, it is provided in the context of the invention that the support plates 98' and 99', which belong to the support structure TR and which extend parallel to the support rail running face 17a and are therefore vertically offset from one another, overlap with the associated support construction 98 and 99 in a parallel position with respect thereto.

FIG. 21 is a simplified side view of the support articulation G, in a section through the articulation axis M when the articulation is not at an angle. In this drawing, the joints of the upper and lower support part Tri and Tri+1 in the partial circle D are denoted by reference numerals 94 and 95. The cooling ducts in the region of the guide rail constituent parts TSi and TSi+1 are likewise interrupted in the region of the lower support construction (FIG. 17). The overlap of the support at the upper and lower part outside the axis of rotation M results in rigidification of the bending moment (the bending moment B1 is shown in FIG. 21a) by comparison with the prior art (the bending moment B2 for the prior art being shown in FIG. 21b). This applies analogously for the torsion element.

As a result of the described design principle, on the one hand the warping is reduced by way of the transfer of moment due to the design. In addition, the weight running face is precisely oriented on the constructional base. Finally, the rail impact can be precisely oriented by way of sheet metal underlays, the corresponding sheet metal underlays, generally compensation pieces or spacers, being provided with reference numeral 91.

The corresponding support construction is shown again in FIG. 21 in a simplified vertical longitudinal section and in FIG. 22 in a simplified vertical cross section.

Modified Bearing System

It has already been explained that the support rail 17 may preferably be formed as a cooling rail 117, which comprises in the interior a cooling duct 41 through which a fluid coolant is pumped. However, the support rail 17 may also be formed as a support rail which is flowed through by gas, and which thus comprises in the interior a flow duct 122 (FIG. 23) which is flowed through by a gaseous medium, in particular by air. In this case, a plurality of gas outlet openings, in particular air openings 122', 122"—through which gas or air under pressure can flow out and flows directly to the underside of the air bearing cushions (pads) 140 referred to as a weight running face 39 on the underside of the clip chain body KK—may be formed on the actual support rail running face 17a. This forms an air cushion 130, ensuring that the corresponding clip chain unit and thus the entire transport chain are supported and guided by means of an air cushion.

This results in an extremely low coefficient of friction and thus a low friction loss. As a result, even particularly high unit speeds can be attained, since air or a gaseous medium—unlike oil—cannot crack. Finally—on the basis of this principle—very simple transport can also be achieved, since the low coefficient of friction also results in very low chain longitudinal forces. In addition, the risk of contamination of the material web to be stretched, in particular the plastics material film to be stretched, by oil particles and oil splashes, which might otherwise be thrown towards the plastics material film, is again reduced.

Situation at the Entrance and Exit of the Transverse Stretching Unit

In the aforementioned peripheral transport system, the transport chain 13 has to be tensioned in a manner determined by the construction and method. So as to reduce load alternation here, it is necessary to allow the transport chain 13 to run up and down tangentially on the chain wheel 51 provided at the entrance and exit, upon leaving the guide rail.

The support rail 17 and/or bracing face arrangement 39 also remains continuously on the chain wheels 51. As a result, by contrast with the prior art, no slides are required for stroke compensation.

To implement the measures, the invention provides a compulsory tangential guide 55 for the guide rail 15 (FIGS. 24 and 25), which in this connection is also referred to as a lateral guide rail in the following.

In the following, the further functionality of the tangential guide 55 is disclosed.

In the following, it is initially assumed that the chain is to be tensioned. In this case, the centre-point 700 of the exit chain wheel migrates through a distance D towards the exit. As a result, the distance W1 between the end of the guide rail 15 and the tangential arrival point on the chain wheel 51 changes with the larger distance W3. So as to keep the construction simple, the adjustment by the distance D is always collinear with the exit guide rail. The adaptation of the exit rail, required because of the displacement by D, is carried out using slides.

However, the tangential arrival of the guide rail 15 on the chain wheel 51 would change as a result of the adjustment. This is prevented in that the shape of the arrival curve 701 of the flexible guide rail 15 is compulsorily changed to a different curve form 702. During the adjustment of the chain wheel, an adjustment block 705, which is attached to a stationary lever 706, is synchronously entrained in movement. So as to ensure the tangential arrival on the chain wheel, the adjustment block is positively driven within a guide link 708 of a stationary link mounting 709. The guide bolts 710 of the adjustment block are thus slid along a calculated curve 711 within the link.

The cooling and the bracing of the gravitational forces are ensured by a peripheral support and cooling rail 17 around the chain wheels, in other words in the region where the guide path extends in a partial peripheral sub-region of the chain wheels.

Finally, for completeness, it should be noted that the aforementioned chain wheels 51 at the exit and/or at the entrance are preferably configured in such a way that the chain wheels 51 cooperate directly with or are driven by a solid-shaft motor 57, as can be seen for example in the side view and cross section of FIGS. 26 and 27.

The invention claimed is:

1. Stretching unit comprising a sliding chain transport system, having the following features:
two peripheral guide paths, provided at a distance from one another with respect to a vertical longitudinal plane, are provided,
a transport chain is peripherally arranged on each of these guide paths,
each of the two transport chains comprises a plurality of chain links articulated to one another,
clip chain units are provided, which are subdivided into a clip part and a chain part which comprises chain links,
the clip part comprises at least one clip mounting for fixing an edge of the material web to be stretched, via which the material web can be gripped and conveyed from an entrance zone via a stretching zone to an exit zone whilst releasing the material web, the guide path comprises a guide rail in each case, the clip chain units comprise at least one stretching force running face, oriented on the stretching side, and a chain force running face facing counter thereto, which are oriented parallel and facing one another, via which the clip chain unit is displaceably guided along the guide rail comprising a chain force running face and a stretching force running face oriented parallel and counter thereto, the chain force running face, in the region of the chain force running face height thereof, and the stretching force running face, by way of the stretching force running face height thereof, interacting with and being guided by the guide rail, a support rail is further provided, which absorbs the gravitational force of the clip chain unit and comprises a support rail running face, the clip mounting, provided on the clip part, for fixing the edge of the material web to be stretched is arranged in such a way that the stretching forces introduced to the clip body via the material web to be stretched act in a stretching plane which is oriented perpendicularly to the gravitational force of the clip chain unit, on different portions of the guide path, centrifugal forces, lateral guidance forces and transverse forces also further act on the clip chain unit, the centrifugal forces acting on the centre of gravity of the chain clip unit act in a centrifugal force plane which is parallel to or coincident with the stretching plane, the transverse forces or the lateral guidance forces act in a transverse force or lateral guidance plane parallel to the stretching force plane, the clip chain unit is formed in such a way that the centrifugal force plane and the lateral guidance or transverse force plane and the stretching force plane are positioned above the lower edge of the guide rail or above the lower end of the chain force running face and/or the stretching force running face, the centrifugal force plane and the lateral guidance or transverse force plane and the stretching force plane intersect the guide rail and the chain force running face in the region of the chain force running face height thereof and the stretching force running face in the region of the stretching force running face height thereof, and one or more sliding elements comprising a bracing face arrangement for bracing the clip chain unit with respect to the running face of the support rail are provided on the underside of the clip chain unit, the plane of gravity which extends through the centre of gravity of the clip chain unit intersecting the bracing face arrangement, with respect to the maximum extension width thereof, transversely to the feed direction and intersecting the support rail running face.

2. Stretching unit according to claim 1, wherein the plane of gravity extending through the centre of gravity of the clip chain unit centrally intersects the bracing face arrangement, with respect to the maximum extension width thereof transversely to the feed direction and the support rail running face, or deviates therefrom by less than 40% with respect to the maximum extension width or the width of the support rail running face.

3. Stretching unit according to either claim 1, wherein the stretching force plane, the centrifugal force plane and the transverse force or lateral guidance force plane intersect the guide rail in a region in which the clip chain unit is braced on the guide rail.

4. Stretching unit according to claim 1, wherein the clip chain unit is formed in such a way that
the centrifugal force plane extends parallel to the stretching force plane at a gravity action spacing,
the transverse force or lateral guidance force plane extends parallel to the stretching force plane at a force action spacing, and
a spacing provided between the plane of gravity and the lower edge of the guide rail is at least twice as large as the larger of the two action spacings.

5. Stretching unit according to claim 1, wherein the clip chain unit and the guide rail are formed in such a way that
the centrifugal force plane and the transverse force or lateral guidance force plane coincide with the stretching force plane, and
a spacing between the plane of gravity and the lower edge of the guide rail is dimensioned in such a way that it is at least 1 mm or more.

6. Stretching unit according to claim 5, wherein the maximum extension width of the bracing face arrangement and thus the maximum extension width of the sliding elements are of a measurement corresponding to at least 2.0 times the width of the guide rail and thus to the horizontal spacing between the chain force running face and the stretching force running face.

7. Stretching unit according to claim 5, wherein the centre-of-gravity plane
a) intersects the bracing face arrangement of the at least one sliding element centrally, and for this purpose the portions, positioned on either side of the centre-of-gravity plane, of the one sliding element or of the separate sliding elements positioned at least on either side thereof have the same face sizes, or
b) intersects said bracing face arrangement off-centre, sliding faces of different sizes being provided on either side of the centre-of-gravity plane so as to achieve the same contact stress.

8. Stretching unit according to claim 5, wherein the portions, positioned on either side of the plane of gravity, of the one sliding element or of the separate sliding elements positioned on either side thereof have the same face sizes and/or are exposed to the same contact stress.

9. Stretching unit according to claim 1, wherein the clip chain unit is formed in such a way that the forces acting thereon are decoupled, and act on the clip chain unit in a tilting-moment free and torque-free manner so as to prevent an increase in the contact stress between the clip chain unit and the support rail.

10. Stretching unit according to claim 1, wherein the clip chain unit is formed in such a way that the forces acting thereon are decoupled, in such a way that the forces acting on the clip chain unit only lead to at most a 10% increase in the tilting moments or torques and thus to a corresponding increase in the contact stress between the clip chain unit and the support rail.

11. Stretching unit according to claim 1, wherein a first cooling device is provided for the support rail and/or a second cooling device is provided for the guide rail, which device(s) is/are provided on the entirety or merely on a partial length of the guide path.

12. Stretching unit according to claim 1, wherein the clip chain unit comprises a U-shaped recess, which extends parallel to the guide rail and in which one or more guide rail sliding bearings are replaceably inserted and which comprises the chain force and stretching force running faces which are to face towards one another.

13. Stretching unit according to claim 12, wherein the guide rail comprises two guide faces, specifically a clip-side guide face and a chain-side guide face, which each cooperate with one or more sliding bearings which are formed, inserted or provided on the clip chin unit.

14. Stretching unit according to either claim 12, wherein the guide rail sliding bearing comprises flattened regions the transverse spacing between the chain force running face and stretching force running face on the leading face and/or on the trailing face thereof, both on the chain force running face and on the stretching force running face.

15. Stretching unit according to claim 14, wherein the flattened regions are formed in a partial circle shape having a convex arc structure in a plan view.

16. Stretching unit according to claim 1, wherein the centre-of-gravity plane of the clip chain unit is arranged in the stretching plane or at an action spacing preferably above the stretching plane which is less than 30% of the height of the chain force running rail or the stretching force running rail.

17. Stretching unit according to claim 1, wherein the action plane of the chain longitudinal force coincides with the stretching plane or is arranged at an action spacing below the stretching plane, the action spacing being less than 30% of the height of the chain force running rail or the stretching force running rail.

18. Stretching unit according to claim 1, wherein the support rail is provided with a duct which passes through at least a partial length of the support rail in the longitudinal direction and which is formed as a cooling duct which can be flowed through by a fluid coolant.

19. Stretching unit according to claim 1, wherein the clip chain unit is formed in such a way that the forces acting thereon are decoupled and act in a tilting-moment-free or torque-free manner, preventing an increase in the contact stress between the clip chain unit and the support rail and/or guide rail.

20. Stretching unit according to claim 1, wherein the clip chain unit is formed in such a way that the forces acting thereon are decoupled, in such a way that the forces acting on the clip chain unit only lead to at most a 10% increase in the tilting moments or torques and thus to a corresponding increase in the contact stress between the clip chain unit and the support rail and/or guide rail.

21. The Stretching unit according to claim 1 comprising a support rail which absorbs the gravitational force of a clip chain unit, wherein the support rail is provided with a duct which passes through at least a partial length of the support rail in the longitudinal direction and which is formed as a cooling duct which can be flowed through by a fluid coolant.

22. Stretching unit according to claim 1, wherein the support rail comprises articulation devices, via which a first and a following second constituent part of the support rail can be set in different angular positions with respect to one another.

23. Stretching unit according to claim 1, wherein the support rail is provided with articulated connections, support rail constituent parts, which can be set in different angular positions with respect to one another, being formed before and after an articulated connection in the forward direction, and in that the support rail is interrupted in the region of the articulated connection by a separating gap, the two interrupted constituent parts of the duct being interconnected via a bypass line.

24. Stretching unit according to claim 22, wherein the support rail running face is arranged in the region of the articulated connection across the separating gaps provided in this region at the same level, in other words which are arranged mutually flush, arrival and departure phases being formed in the region of the separating gap on the support rail constituent parts which adjoin one another there.

25. Stretching unit according to claim 23, wherein the support rail constituent parts and the articulated connection provided in this region are formed rigid against warping and torsion so as to maintain a mutually flush support rail running face.

26. Stretching unit according to claim 23, wherein, before or after an articulated connection, the support rail or individual support rail constituent parts comprise a support construction, specifically comprising a lower support part and an upper support part at a distance therefrom, the respective upper and lower support part each being rigidly interconnected via at least one reinforcing rib, and the upper and lower support part of two successive support structures being arranged extending away via the articulation into the overlapping structure.

27. Stretching unit according to claim 26, wherein, at each of at least one upper and one lower support part, a plate-shaped support plate articulation portion is formed, in which an articulation disc is arranged which passes through a corresponding hole in the overlap region comprising the adjacent preceding or following support part.

28. Stretching unit according to claim 23, wherein the support rail or the support rail constituent parts are braced and held on the lower support parts directly or with the interposition of spacers or insulating spacers.

29. Stretching unit according to claim 1, wherein the clip part and/or the transport part consist of or comprise one or more composite materials at more than 25% by volume or by weight.

30. Stretching unit according to claim 29, wherein the clip part and/or the transport part comprises at least one composite material comprising at least one matrix material and at least one functional component or property component,
   a) the at least one matrix component comprising one or more of the materials of aluminium, magnesium, ceramics, carbon, thermosetting plastics, elastomers and/or thermoplastics, and
   b) the property component or functional component comprising or consisting of one or more of the materials of glass fibres, carbon fibres, ceramics fibres, aramid fibres, boron fibres, steel fibres and/or nylon fibres, in particular in a long-fibre configuration.

31. Stretching unit according to claim 1, wherein the transport chain is guided around at least one chain wheel along a partial periphery, and in that the support rail is provided with the support rail running face in this region too.

32. Stretching unit according to claim 1, characterised by the following features:
   an exit chain wheel is provided in the region of the guide path,
   said exit chain wheel can be set and positioned in different positions,
   a lever—on the radial end of which an exit curve is provided in a relatively adjustable manner, the orientation of which can be changed to a different curve shape by means of the flexible guide rail ending thereat—is arranged concentrically with the axis of the chain wheel and rotatably,
   for which purpose an adjustment block is attached to the lever which is pivotable about the axis of the chain wheel, in such a way that a tangential connection of the adjacent flexible guide rail to the exit chain wheel is always maintained in spite of adjustment of the exit curve.

33. Stretching unit having the following features:

an exit chain wheel is provided in the region of the guide path, said exit chain wheel can be set and positioned in different positions, a lever—on the radial end of which an exit curve is provided in a relatively adjustable manner, the orientation of which can be changed to a different curve shape by means of the flexible guide rail ending thereat—is arranged concentrically with the axis of the chain wheel and rotatably, for which purpose an adjustment block is attached to the lever which is pivotable about the axis of the chain wheel, in such a way that a tangential connection of the adjacent flexible guide rail to the exit chain wheel is always maintained in spite of adjustment of the exit curve.

34. Stretching unit according to claim 1, wherein the gravitational force acting on the centre of gravity of the clip chain unit or the centre-of-gravity plane, extending through this centre of gravity, of the clip chain unit is positioned in the region of the chain force running face or of the stretching force running face or within the width of the guide rail.

* * * * *